US012747410B2

(12) United States Patent
Lynch et al.

(10) Patent No.: US 12,747,410 B2
(45) **Date of Patent: *Sep. 29, 2026**

(54) LOW-WATER COMPOSITIONS COMPRISING CAPSULES

(71) Applicant: The Procter & Gamble Company, Cincinnati, OH (US)

(72) Inventors: Matthew Lawrence Lynch, Mariemont, OH (US); Brandon Philip Illie, Felicity, OH (US); Kristin Rhedrick Williams, West Chester, OH (US); Jocelyn Michelle McCullough, Loveland, OH (US); Pierre Daniel Verstraete, Woluwe Saint Lambert (BE); Andre Martim Barros, Woluwe Saint Etienne (BE); Mariana B. T. Cardoso, Brussels (BE); Johan Smets, Lubbeek (BE); Vighter Iberi, Mason, OH (US); Karen Diana Hufford, Amelia, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 434 days.

This patent is subject to a terminal disclaimer.

(21) Appl. No.: 18/366,715

(22) Filed: Aug. 8, 2023

(65) Prior Publication Data

US 2024/0060003 A1 Feb. 22, 2024

Related U.S. Application Data

(60) Provisional application No. 63/397,407, filed on Aug. 12, 2022.

(51) Int. Cl.
*C11D 1/04* (2006.01)
*C11D 3/04* (2006.01)
(Continued)

(52) U.S. Cl.
CPC ................ *C11D 1/04* (2013.01); *C11D 3/044* (2013.01); *C11D 3/2068* (2013.01); *C11D 3/505* (2013.01); *C11D 2111/12* (2024.01)

(58) Field of Classification Search
CPC ......... C11D 1/04; C11D 3/044; C11D 3/2068; C11D 3/505; C11D 2111/12
See application file for complete search history.

(56) References Cited

U.S. PATENT DOCUMENTS 3,043,778 A 7/1962 Kelly
4,285,826 A 8/1981 Bertozzi et al.
(Continued)

FOREIGN PATENT DOCUMENTS

CA 3035448 A1 3/2018
EP 3282003 A1 * 2/2018 ........... C11D 3/3707
(Continued)

OTHER PUBLICATIONS

All Office Actions; U.S. Appl. No. 18/366,709, filed Aug. 8, 2023.
(Continued)

*Primary Examiner* — Gregory R Delcotto
*Assistant Examiner* — Brittany Sharon Harris
(74) *Attorney, Agent, or Firm* — Carolyn S. Powell; James E. Oehlenschlager

(57) ABSTRACT

A low-water composition comprising a solid dissolvable composition domain having a crystallizing agent and a PEGC domain.

19 Claims, 8 Drawing Sheets

(51) Int. Cl.
*C11D 3/20* (2006.01)
*C11D 3/50* (2006.01)

(56) References Cited

U.S. PATENT DOCUMENTS

| | | | | |
|---|---|---|---|---|
| 5,340,492 | A | 8/1994 | Kacher et al. | |
| 5,540,852 | A | 7/1996 | Kefauver et al. | |
| 6,221,829 | B1 | 4/2001 | Symes | |
| 6,562,769 | B1 | 5/2003 | Paatz et al. | |
| 6,825,161 | B2 | 11/2004 | Shefer et al. | |
| 8,389,462 | B2 | 3/2013 | Janszen et al. | |
| 8,754,028 | B2 | 6/2014 | Velazquez | |
| 10,144,903 | B2 | 12/2018 | Amorelli et al. | |
| 11,834,630 | B2 | 12/2023 | Brooker et al. | |
| 2002/0045555 | A1 | 4/2002 | Andreas | |
| 2004/0097387 | A1 | 5/2004 | Taylor et al. | |
| 2005/0003975 | A1 | 1/2005 | Browne et al. | |
| 2009/0286706 | A1 | 11/2009 | Chakrabarty et al. | |
| 2012/0028874 | A1 | 2/2012 | Fernandez et al. | |
| 2013/0217609 | A1 | 8/2013 | Fernandes et al. | |
| 2013/0281343 | A1 | 10/2013 | Astolfi et al. | |
| 2014/0179587 | A1 | 6/2014 | Brown et al. | |
| 2016/0040096 | A1 | 2/2016 | Smets et al. | |
| 2016/0354504 | A1 | 12/2016 | Sasaki | |
| 2019/0169542 | A1 | 6/2019 | Frankenbach et al. | |
| 2019/0169549 | A1 | 6/2019 | Deflorian | |
| 2019/0276387 | A1 | 9/2019 | Flachsmann | |
| 2020/0095267 | A1 | 3/2020 | Panandiker et al. | |
| 2020/0330948 | A1 | 10/2020 | Cardoso et al. | |
| 2020/0330949 | A1 * | 10/2020 | Cardoso | A61K 9/501 |
| 2020/0406218 | A1 | 12/2020 | Berthier et al. | |
| 2021/0277327 | A1 | 9/2021 | Panandiker et al. | |
| 2021/0315783 | A1 | 10/2021 | Lynch et al. | |
| 2021/0315812 | A1 | 10/2021 | Lynch et al. | |
| 2021/0339217 | A1 | 11/2021 | Feng | |
| 2022/0010245 | A1 | 1/2022 | Lynch et al. | |
| 2022/0098528 | A1 | 3/2022 | Agarkhed et al. | |
| 2022/0118287 | A1 | 4/2022 | Cetti et al. | |
| 2022/0118417 | A1 | 4/2022 | Smith et al. | |
| 2022/0119743 | A1 | 4/2022 | Barros et al. | |
| 2022/0177813 | A1 | 6/2022 | Natoli et al. | |
| 2024/0060013 | A1 | 2/2024 | Lynch | |
| 2024/0252682 | A1 | 8/2024 | Altshuler et al. | |
| 2024/0372208 | A1 | 11/2024 | Jang et al. | |

FOREIGN PATENT DOCUMENTS

| | | | | |
|---|---|---|---|---|
| EP | 3459622 | A1 | 3/2019 | |
| EP | 3233200 | B1 | 9/2021 | |
| JP | S63248899 | A | 10/1988 | |
| JP | 2003064400 | A | 3/2003 | |
| JP | 2004331592 | A | 11/2004 | |
| JP | 2014213072 | A | 11/2014 | |
| WO | 9209679 | A1 | 6/1992 | |
| WO | 9216610 | A1 | 10/1992 | |
| WO | WO-2014037167 | A1 * | 3/2014 | C11D 9/26 |
| WO | 2020260598 | A1 | 12/2020 | |
| WO | WO-2021123018 | A1 * | 6/2021 | C11D 9/16 |
| WO | 2021207440 | A1 | 10/2021 | |
| WO | 2022017888 | A1 | 1/2022 | |
| WO | 2022122878 | A1 | 6/2022 | |

OTHER PUBLICATIONS

All Office Actions; U.S. Appl. No. 18/366,710, filed Aug. 8, 2023.
All Office Actions; U.S. Appl. No. 18/366,712, filed Aug. 8, 2023.
All Office Actions; U.S. Appl. No. 18/366,713, filed Aug. 8, 2023.
All Office Actions; U.S. Appl. No. 18/366,714, filed Aug. 8, 2023.
All Office Actions; U.S. Appl. No. 18/366,717, filed Aug. 8, 2023.
All Office Actions; U.S. Appl. No. 18/366,719, filed Aug. 8, 2023.
All Office Actions; U.S. Appl. No. 18/366,730, filed Aug. 8, 2023.
All Office Actions; U.S. Appl. No. 18/366,736, filed Aug. 8, 2023.
Unpublished U.S. Appl. No. 18/366,709, filed Aug. 8, 2023, to Matthew Lawrence Lynch et. al.
Unpublished U.S. Appl. No. 18/366,710, filed Aug. 8, 2023, to Matthew Lawrence Lynch et. al.
Unpublished U.S. Appl. No. 18/366,712, filed Aug. 8, 2023, to Matthew Lawrence Lynch et. al.
Unpublished U.S. Appl. No. 18/366,713, filed Aug. 8, 2023, to Matthew Lawrence Lynch et. al.
Unpublished U.S. Appl. No. 18/366,714, filed Aug. 8, 2023, to Matthew Lawrence Lynch et. al.
Unpublished U.S. Appl. No. 18/366,717, filed Aug. 8, 2023, to Matthew Lawrence Lynch et. al.
Unpublished U.S. Appl. No. 18/366,719, filed Aug. 8, 2023, to Matthew Lawrence Lynch et. al.
Unpublished U.S. Appl. No. 18/366,730, filed Aug. 8, 2023, to Matthew Lawrence Lynch et. al.
Unpublished U.S. Appl. No. 18/366,736, filed Aug. 8, 2023, to Matthew Lawrence Lynch et. al.
"Standard For Named Vegetable Oils: Codex Alimentarius", Retrieved from: https://www.fao.org/fao-who-codexalimentarius/sh-proxy/en/?lnk=1&url=https%253A%252F%252Fworkspace.fao.org%252Fsites%252Fcodex%252FStandards%252FCXS%28210-1999%252FCXS_210e.pdf, Dec. 31, 2019, 15 Pages.
PCT Search Report and Written Opinion for PCT/US2023/071807.

* cited by examiner

25°C

4°C

LOW-WATER COMPOSITIONS COMPRISING CAPSULES

FIELD OF THE INVENTION

Low-water compositions comprising solid dissolvable composition (SDC) domains having a mesh microstructure formed from dry sodium fatty acid carboxylate formulations, polyethylene glycol domains (PEGC), and freshness benefit agent(s) that dissolve during normal use to deliver extraordinary freshness to fabrics.

BACKGROUND OF THE INVENTION

Freshness beads are directly added to the washer drum to deliver freshness to the wash cycle. In the most basic design, the beads are composed of a ‘primary’ carrier (e.g., PEG, different molecular weight) and freshness benefit agent (e.g., perfume capsules, neat perfumes) to deliver a freshness benefit. Suitable base compositions are disclosed, for example, in U.S. Pat. No. 8,476,219 B2. In the more sophisticated designs, the beads are also composed of one or more ‘secondary’ carriers (often called fillers), which are dispersed in a primary carrier, to fill one or more specific function in the beads. For example, in one disclosure (U.S. Pat. No. 9,347,022 B1), starch granules are added to the PEG in a bead to reduce the cost of the bead. In another disclosure (WO 2021/170759 A1), polymers, inorganic salts, clays, saccharides, polysaccharides, glycerol, and fatty alcohols are added to facilitate processing and to enhance stability. In still further examples, beads are composed of ‘primary’ carriers including salt and sugar, sodium acetate trihydrate and block copolymer as disclosed in U.S. Pat. Nos. 11,008,535 B2, 11,220,657 B2, and 10,683,475 B2 respectively.

The formulation of effective solid dissolvable compositions presents a considerable challenge. The compositions need to be physically stable, and preferably temperature resistant and humidity resistant, yet still be able to perform the desired function by dissolving in solution and leaving little or no material behind. Solid dissolvable compositions are well known in the art and have been used in several roles, such as detergents, oral and body medications, disinfectants, and cleaning compositions.

It is surprising that one can create a solid dissolvable composition (SDC) having a mesh microstructure formed from dry sodium fatty acid carboxylate that can comprise high levels of active, that readily solubilizes in water during laundry wash conditions, yet is temperature and humidity resistant, allowing for supply chain stability. It was discovered that low-water compositions having both PEGC and SDC domains provides significant advantages over current freshness beads including solubility rate enhancement, sustainability, broadened fragrance palette, moisture control, greater sourcing opportunities, cost reduction, light-weighting for efficient e-commerce transport, and protection of incompatible chemistries.

SUMMARY OF THE INVENTION

A low-water composition is provided which substantially dissolves during normal use to deliver extraordinary freshness to fabrics, and is composed of a solid dissolvable composition (SDC) domain made from crystallizing agent; a polyethylene glycol (PEGC); a population of capsules comprising a freshness benefit agent; and wherein the crystallizing agent is the sodium salt of saturated fatty acids having from 8 to about 12 carbon atoms; wherein the capsules are present in at least one of the SDC or PEGC; and wherein the capsules comprise:

- an oil-based core comprising a benefit agent; and
- a shell surrounding the core, the shell comprising:
  - a substantially inorganic first shell component comprising:
    - a condensed layer comprising a condensation product of a precursor, and
    - a nanoparticle layer comprising inorganic nanoparticles, wherein the condensed layer is disposed between the core and the nanoparticle layer, and
  - an inorganic second shell component surrounding the first shell component, wherein the second shell component surrounds the nanoparticle layer, and wherein the precursor comprises at least one compound of Formula (I)

$$(M^vO_zY_n)_w \qquad \text{(Formula I)}$$

where M is one or more of silicon, titanium and aluminum, v is the valence number of M and is 3 or 4, z is from 0.5 to 1.6 each Y is independently selected from —OH, —$OR^2$, halo,

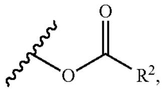
,

—$NH_2$, —$NHR^2$, —$N(R^2)_2$, and

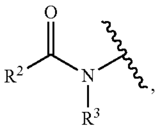
, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v-1), and w is from 2 to 2000.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of elements in any of the exemplary embodiments, except as may be explicitly delineated in the corresponding written description. None of the drawings are necessarily to scale.

DETAILED DESCRIPTION OF THE INVENTION

Figure 1A:
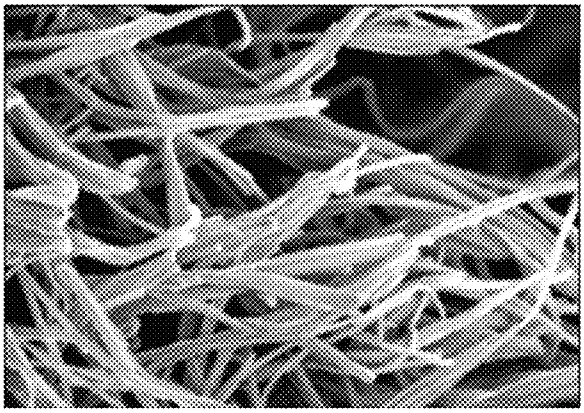
FIG. 1A shows Scanning Electron Micrographs (SEMs) of crystallization agent crystals.

The present invention includes low-water compositions that substantially to completely dissolve in a laundry wash cycle to deliver extraordinary freshness to fabrics. The low-water compositions include at least one domain of solid dissolvable composition (DSC) comprising a crystalline mesh, at least one domain of polyethylene glycol composition (PEGC), and in embodiments one or more freshness benefit agents, which may be at high levels. The crystalline mesh ("mesh") comprises a relatively rigid, three-dimensional, interlocking skeleton framework of fiber-like crystals formed during processing with the crystallizing agents. The solid dissolvable compositions of the present invention have crystallizing agent(s), a low water content, freshness benefit agent(s), and are easily dissolvable at target wash temperatures.

The present invention may be understood more readily by reference to the following detailed description of illustrative compositions. It should be understood that the scope of the claims is not limited to the specific products, methods, conditions, devices, or parameters described herein, and that the terminology used herein is not intended to be limiting of the claimed invention.

"Solid Dissolvable Composition" (SDC), as used herein comprises crystallizing agents of sodium fatty acid carboxylate, which when processed correctly, form an interconnected crystalline mesh of fibers that readily dissolve at target wash temperatures, optional freshness benefit agent, and 10 wt % or less of the water present during an initial mixing stage in the form of a solid particle.

"PEG Composition" (PEGC), as used herein comprises PEG and optional freshness benefit agent.

"Domain", as used herein means a contiguous mass that comprises substantially the same material. In one embodiment, a domain may comprise SDC; in another embodiment a domain may comprise PEGC.

"Low-Water Composition", as used herein means a freshness composition that comprises both SDC and PEGC domains, freshness benefit agent and, wherein the low water composition has a water content less than about 10 wt %.

"Consumer product", herein contains a low-water composition purchased to impart freshness to fabric during a wash cycle, having single or many particles which are added to a washer drum before or during a rinse or wash cycle to impart superior freshness to fabrics. Such products include—but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such products may be used as a pre-laundering treatment, and post-laundering treatment.

"Particle", as used herein means a discrete mass (or chunk) in a low-water composition, typically greater than about 5 mg in mass and larger than 1 mm in size. The particles may have different shapes including, but not limited to hemi-sphere, sphere, plate, gummy bear, and cashew. The particles may have one or more domains.

"Solid Dissolvable Composition Mixture" (SDCM), as used herein comprises the components of a solid dissolvable composition prior to water removal (for example, during the mixture stage or crystallization stage). To produce the solid dissolvable composition the intermediate solid dissolvable composition mixture is formed first that comprises an aqueous phase, comprising an aqueous carrier. The aqueous carrier may be distilled, deionized, or tap water. The aqueous carrier may be present in an amount of about 65 wt % to 99.5 wt %, alternatively about 65 wt % to about 90 wt %, alternatively about 70 wt % to about 85 wt %, alternatively about 75 wt %, by weight of the SDCM.

"Rheological Solid Composition" (RSC), as used herein describes the solid form of the SDCM after the crystallization (crystallization stage) before water removal to give an SDC, wherein the RSC comprises greater than about 65 wt % water, and the solid form is from the 'structured' mesh of interlocking (mesh microstructure), fiber-like crystalline particles from the crystallizing agent.

"PEG", as used herein comprises polyethylene glycol (PEG), with molecular weight from about 200 to about 50,000 Daltons, most preferably between about 6,000 and 10,000 Daltons.

"Freshness benefit agent", as used herein and further described below, includes material added to a domain to impart freshness benefits to fabric through a wash. In embodiments, a freshness benefit agent may be a neat perfume; in embodiments, a freshness benefit agent may be an encapsulated perfume (perfume capsule); in embodiments, a freshness benefit agent may be a mixture of perfume and/or perfume capsules.

"Crystallization Temperature", as used herein to describe the temperature at which a crystallizing agent (or combination of crystallizing agents) are completely solubilized in the SDCM; alternatively, herein to describe the temperature at which a crystallizing agent (or combination of crystallizing agents) show any crystallization in the SDCM.

"Dissolution Temperature", as used herein to describe the temperature at which a low-water composition is completely solubilized in water under normal wash conditions.

"Stability Temperature", as used herein is the temperature at which most (or all) of the SDC and/or PEGC domain material(s) completely melts, such that a composition no longer exhibits a stable solid structure and may be considered a liquid or paste, and the low-water composition no longer functions as intended. The stability temperature is the lowest temperature thermal transition, as determined by the THERMAL STABILITY TEST METHOD. In embodiments of the present invention the stability temperature may be greater than about 40° C., more preferably greater than about 50° C., more preferably greater than about 60° C., and most preferably greater than about 70° C., to ensure stability in the supply chain. One skilled in the art understands how to measure the lowest thermal transition with a Differential Scanning calorimetry (DSC) instrument.

"Humidity Stability", as used herein is the relative humidity at which the low water composition spontaneously absorbs more than 5 wt % of the original mass in water from the humidity from the surrounding environment, at 25° C. Water absorption may occur in either the SDC and/or PEGC domains. Absorbing low amounts of water when exposed to humid environments enables more sustainable packaging. Absorbing high amounts of water risks softening or liquifying the composition, such that it no longer functions as intended. In embodiments of the present invention the humidity stability may be above 70% RH, more preferably above 80% RH, more preferably above 90% RH, the most preferably above 95% RH. One skilled in the art understands how to measure 5% weight gain with a Dynamic Vapor Sorption (DVS) instrument, further described in the HUMIDITY TEST METHOD.

"Cleaning composition", as used herein includes, unless otherwise indicated, granular or powder-form all-purpose or "heavy-duty" washing agents, especially cleaning detergents; liquid, gel or paste-form all-purpose washing agents, especially the so-called heavy-duty liquid types; liquid fine-fabric detergents; hand dishwashing agents or light duty dishwashing agents, especially those of the high-foaming type machine dishwashing agents, including the various pouches, tablet, granular, liquid and rinse-aid types for household and institutional use; liquid cleaning and disinfecting agents, including antibacterial hand-wash types, cleaning bars, mouthwashes, denture cleaners, dentifrice, car or carpet shampoos, bathroom cleaners; hair shampoos and hair-rinses; shower gels and foam baths and metal cleaners; as well as cleaning auxiliaries such as bleach additives and "stain-stick" or pre-treat types, substrate-laden products such as dryer added sheets, dry and wetted wipes and pads, nonwoven substrates, and sponges; as well as sprays and mists.

"Dissolve during normal use", as used herein means that the low-water composition completely or substantially dissolves during the wash cycle. One skilled in the art recognizes that washing cycles have a broad range of conditions (e.g., cycle times, machine types, wash solution compositions, temperatures). Suitable compositions completely or substantially dissolve in at least at one of these conditions.

As used herein, the term "bio-based" material refers to a renewable material.

As used herein, the term "renewable material" refers to a material that is produced from a renewable resource. As used herein, the term "renewable resource" refers to a resource that is produced via a natural process at a rate comparable to its rate of consumption (e.g., within a 100-year time frame). The resource can be replenished naturally, or via agricultural techniques. Non-limiting examples of renewable resources include plants (e.g., sugar cane, beets, corn, potatoes, citrus fruit, woody plants, lignocellulose, hemicellulose, cellulosic waste), animals, fish, bacteria, fungi, and forestry products. These resources can be naturally occurring, hybrids, or genetically engineered organisms. Natural resources, such as crude oil, coal, natural gas, and peat, which take longer than 100 years to form, are not considered renewable resources. Because at least part of the material of the invention is derived from a renewable resource, which can sequester carbon dioxide, use of the material can reduce global warming potential and fossil fuel consumption.

As used herein, the term "bio-based content" refers to the amount of carbon from a renewable resource in a material as a percent of the weight (mass) of the total organic carbon in the material, as determined by ASTM D6866-10 Method B.

The term "solid" refers to the state of composition under the expected conditions of storage and use of the low-water composition.

As used herein, the articles including; "a" and "an" when used in a claim, are understood to mean one or more of what is claimed or described.

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Figure 1B:
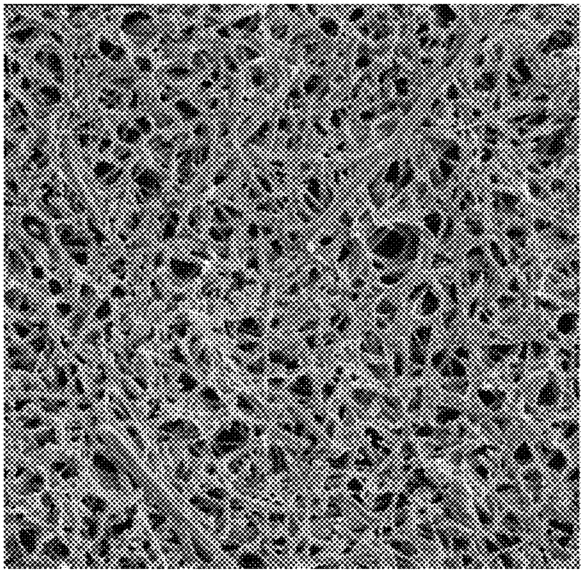
FIG. 1B shows Scanning Electron Micrographs (SEMs) of mesh microstructure made from crystallized crystallization agent, in the SDC domains.
Figure 2A:
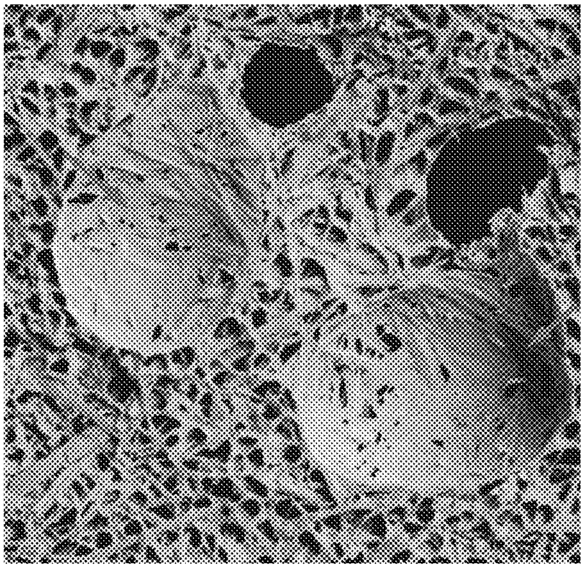
FIG. 2A shows Scanning Electron Micrographs (SEMs) of viable perfume capsules (e.g., red arrow, top) dispersed in the mesh microstructure of the SDC domains.
Figure 2B:
FIG. 2B shows Scanning Electron Micrographs (SEMs), of perfume capsules dispersed in the mesh microstructure of the SDC domains.

The solid dissolvable compositions (SDC) comprise fibrous interlocking crystals (FIGS. 1A and 1B) with sufficient crystal fiber length and concentration to form a mesh microstructure. The mesh allows the SDC to be solid, with a relatively small amount of material. The mesh also allows the entrapment and protection of particulate freshness benefits agents, such as perfume capsules (FIGS. 2A and 2B). In embodiments, an active is a discrete particle have a diameter of less than 100 μms, preferably less than 50 μms and more preferably less than 25 μms. Further, the significant voids in the mesh microstructure also allows the inclusion of liquid freshness benefits agents, such as neat perfumes. In embodiments, one can preferably add up to about 15 wt % neat perfume, preferably between 13 wt % and 0.5 wt %, preferably between 13 wt % and 2 wt %, most preferably between 10 wt % and 2 wt %. The voids also provide a pathway for water to entrain into the microstructure during washing to speed the dissolution relative to completely solid compositions.

It is surprising that it is possible to prepare SDC that have high dissolution rates, low water content, humidity resistance, and thermal stability. Sodium salts of long chain length fatty acids (i.e., sodium myristate (NaC14) to sodium stearate (NaC18) can form fibrous crystals. It is generally understood that the crystal growth patterns leading to a fibrous crystal habit reflect the hydrophilic (head group) and hydrophobic (hydrocarbon chain) balance of the NaC14-NaC18 molecules. As disclosed in this application, while the crystallizing agents used have the same hydrophilic contribution, they have extraordinarily different hydrophobic character owing to the shorter hydrocarbon chains of the employed sodium fatty acid carboxylates. In fact, carbon chains are about one-half the length of those previous disclosed (US2021/0315783A1). Further, one skilled in the art recognizes that many surfactants such as alkyl sulfates are subject to significant uptake of humidity and subject to significant temperature induced changes, having the same chains but different head groups. The select group of crystallizing agents in this invention enables all these useful properties.

Figure 3:
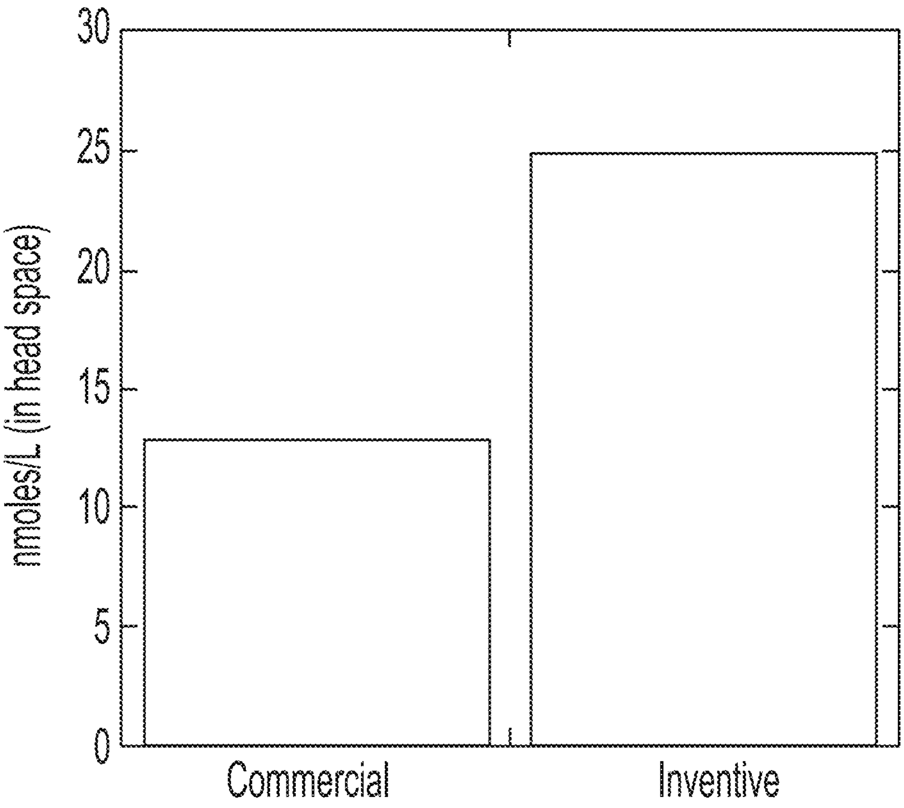
FIG. 3 is a graph showing quantity of perfume in the head space above dry, rubbed fabrics treated with the viable amount of commercial product (about 1 gram perfume capsules, heaping cap) versus inventive composition (about 2.5 grams perfume capsules, ½ cap). The inventive composition has much greater amounts of perfume in the air with a much smaller product add to the wash.

Current water-soluble polymers (e.g., PEG alone) present limitations to the use of encapsulated perfumes as a scent booster delivery system. Encapsulated perfumes are delivered in a water-based slurry, and the slurry is limited to 20-30 wt % maximum of encapsulated perfumes, limiting the total amount of encapsulated perfume to about 1.2 wt %. Use of encapsulated perfume levels above these levels prevent the water-soluble carrier from solidifying, thereby limiting encapsulated perfume delivery. The result is that consumers generally underdose the desired amount of freshness just due to limitations on what they can add into the wash. The dissolvable solid compositions of the present invention can structure up to about 18 wt % perfume capsules and yield about 15× fragrance delivery, as compared to current water-soluble polymers. Such high delivery is at least partially enabled by the low water content of the present compositions, which allows a user a significant freshness upgrade versus current commercial fabric freshness beads (FIG. 3).

Figure 4A:
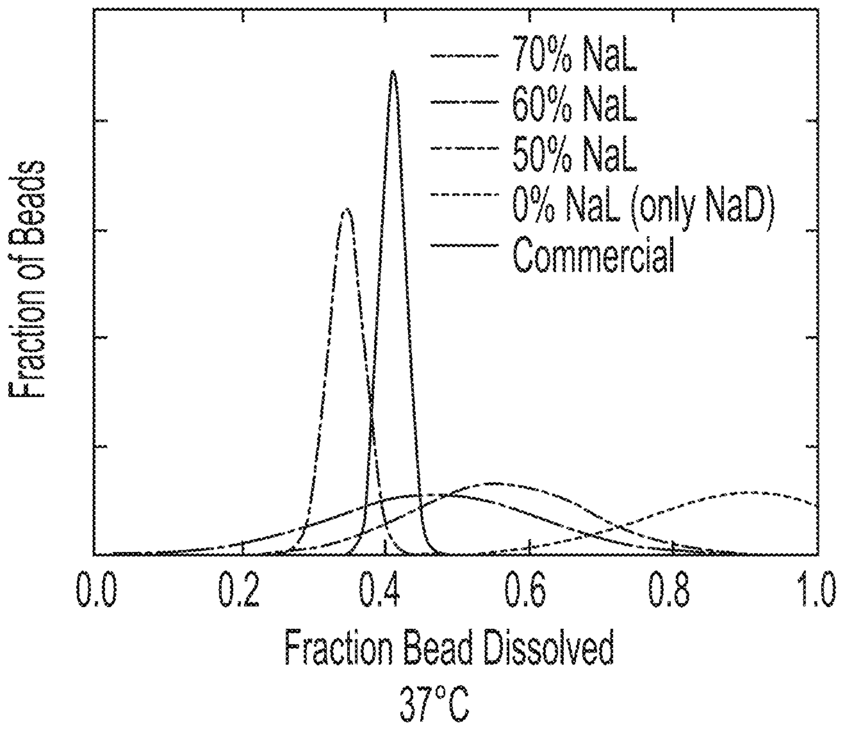
FIGS. 4A, 4B and 4C show dissolution behavior of SDC, prepared with different combinations of crystallizing agents and relative to commercial PEG, as determined using the DISSOLUTION TEST METHOD.
Figure 4B:
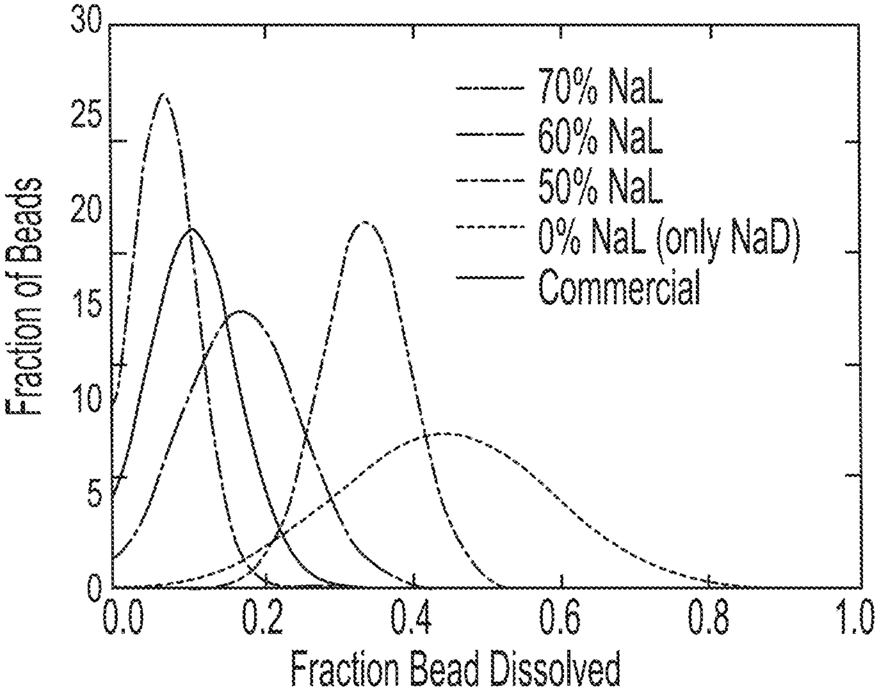
Figure 4C:
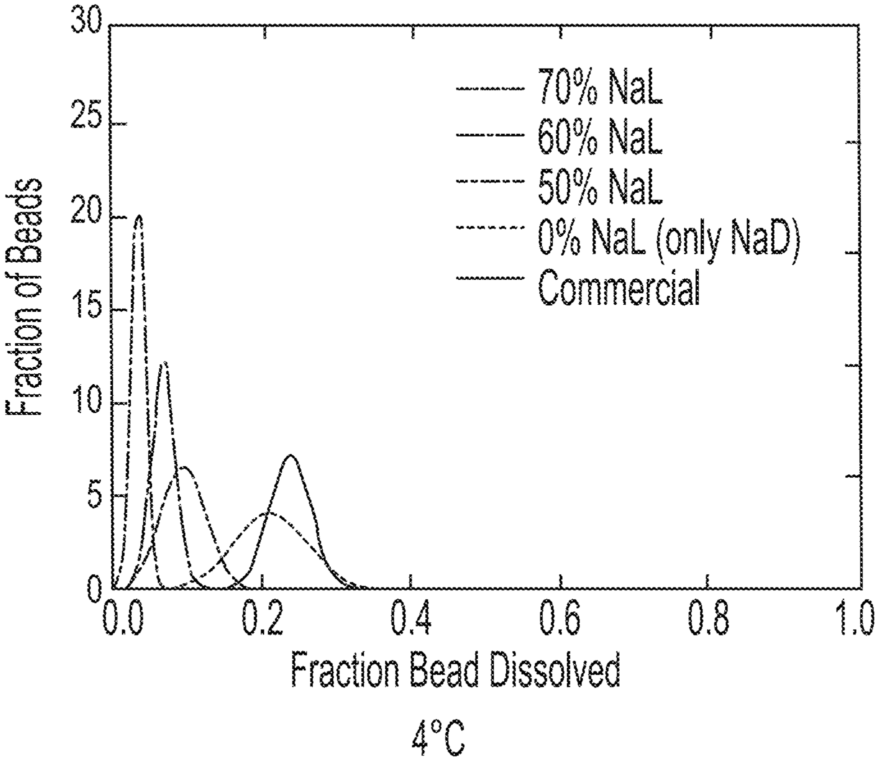

The improved performance of the present inventive compositions as compared to current freshness laundry beads is thought to be linked to the dissolution rate of the compositions' matrix. Without being limited to theory it is believed if the composition dissolves later in the wash cycle, the encapsulated perfumes are more likely to deposit on fabrics through-the-wash (TTW) to enhance freshness performance. Current water-soluble polymers used in commercial fabric freshness beads have limited dissolution rates, set by the limited molecular weight (MW) range of the polyethylene glycol (PEG) used as a dissolution matrix. Consequently, one single bead of PEG must function under a range of machine and wash conditions, limiting performance. In contrast the dissolution rate of the present compositions can be tuned for a range of machine and wash conditions by adjusting the ratio of the composition components (e.g., sodium laurate (NaL) to sodium decanoate (NaD) ratio) (FIG. 4A-FIG. 4C). This allows the opportunity to create a wide range of compositions useful in many differing wash conditions, where SDC domains can release the freshness benefit agents at different times in the wash cycle.

The predominant commercial fabric freshness bead making process limits the selection of freshness benefit agents; instead, domains of the SDC can be processed and added to the low-water compositions. The PEG used to form most current commercial beads must be processed above the melting point of the PEG (between 70° C.-80° C.); preparing SDC domains at room temperature allows for a wider variety of freshness technologies. In practical processes, temperatures at the melting point of the PEG must be maintained for hours, and some perfume raw materials are exceptionally volatile, and will flash off during processing. The inclusion of perfume oil for SDC is done at about 25° C., opening a wide range of addition neat perfume. Further, many perfume capsule wall architectures will fail at the higher process temperatures releasing the encapsulate perfumes and making them ineffective in the low-water composition. Processing in the perfumes capsules at the lower temperature enables a broader range of capsules.

Controlling water migration in mixed bead compositions (e.g., low-water and high-water content beads) is difficult with the current water-soluble polymers used, as water migrates to the surface of high-water content beads. Since the beads are often packaged in an enclosed package that minimizes moisture transmission into and out of the package, trapped moisture on the surface of high-water content beads contacts with the surface of low-water content beads, leading to bead clumping and product dispensing issues. In contrast, the structure of the dissolvable solid compositions prevents water migration, and therefore enables use of materials that are sensitive to water uptake (e.g., cationic polymers, bleaches).

Figure 5:
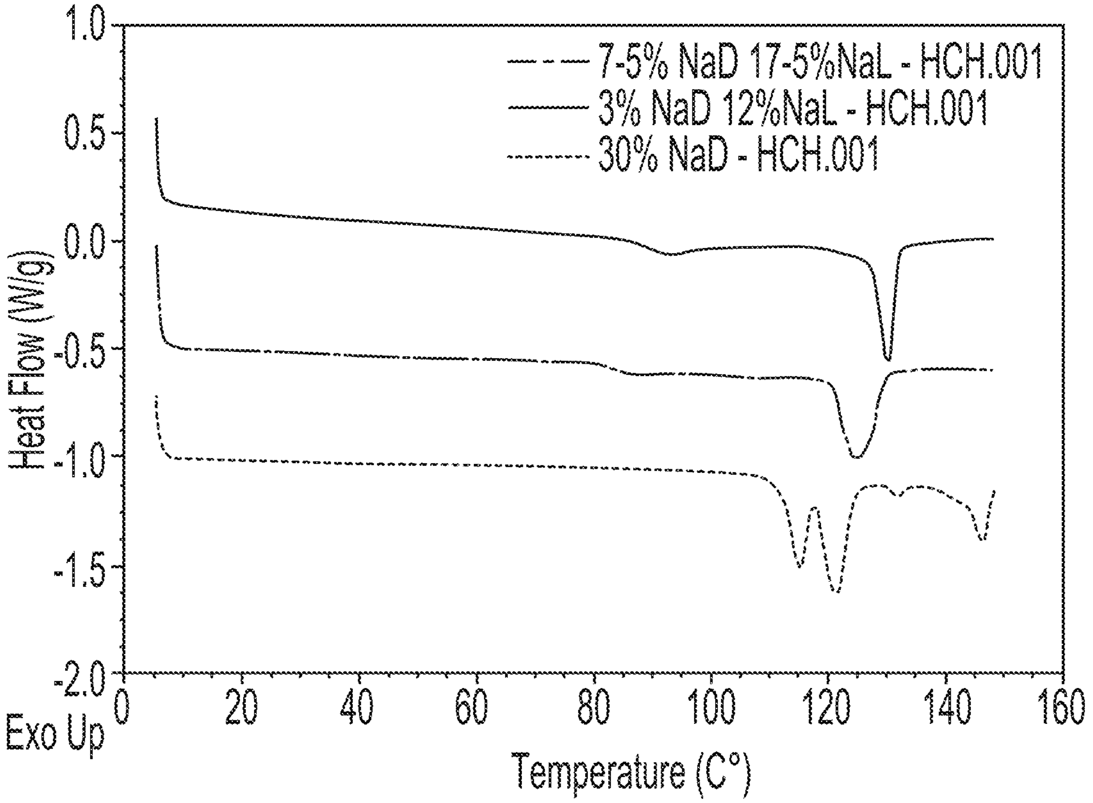
FIG. 5 Is a graph showing measure of the Stability Temperature of the SDC domains for three inventive compositions, using the THERMAL STABILITY TEST METHOD.
Figure 6:
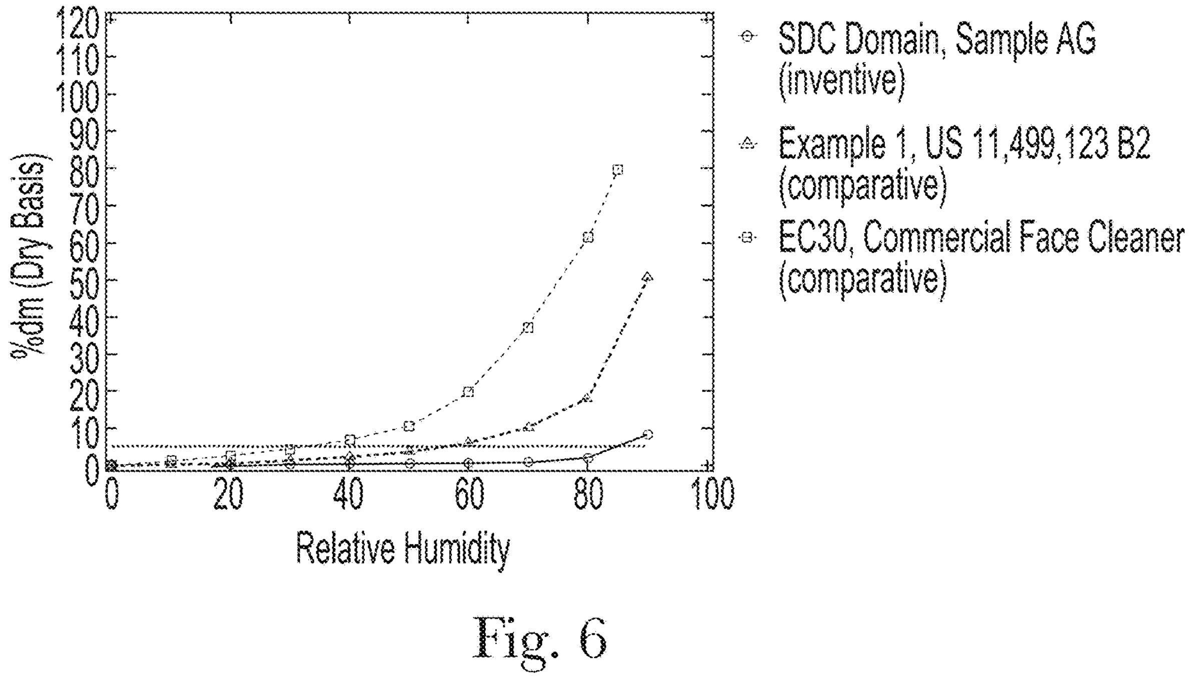
FIG. 6 Is a graph showing hydration stability of inventive and comparative composition SDC domains, by measuring with the HUMIDITY TEST METHOD the uptake of moisture at 25° C., when exposed to different relative humidities.

As discussed previously current bead formulations use PEG (and other structuring materials), are susceptible to degradation when exposed to heat and/or humidity during transit. To mitigate against such degradation special shipping conditions and/or packaging are often thus required. The SDC of the present invention comprises a crystalline structure that is stable in a range of temperature and humidity conditions. The SDC domains preferably show % dm<5% at 70% RH, more preferably % dm<5% at 80% RH and most preferably % dm<5% at 90% RH (FIG. 5) as determined by the HUMIDITY TEST METHOD and essential no melting transitions below 50° C. as determined by the THERMAL STABILITY TEST METHOD (FIG. 6). Consequently, additional resources for refrigeration during shipping and plastic packaging to prevent moisture transfer are not required. Inclusion of the SDC domains in the low-water compositions, enable robust protection of the freshness benefit agents.

Finally, not wishing to be limited to theory, it is believed that the high dissolution rate of the solid dissolvable composition is provided at least in part by the mesh microstructure. This is believed to be important, as it is this porous structure that provides both 'lightness' to the product, and its ability to dissolve rapidly relative to compressed tablets, which allows ready delivery of actives during use. It is believed to be important that a single crystallizing agent (or in combination with other crystallizing agents) form fibers in the solid dissolvable composition making process. The formation of fibers allows solid dissolvable compositions that can retain actives without need for compression, which can break microencapsulates.

In embodiments fibrous crystals may have a minimum length of 10 μm and thickness of 2 μm as determined by the FIBER TEST METHOD.

In embodiments actives may be in the form of particles which may be: a) evenly dispersed within the mesh microstructure; b) applied onto the surface of the mesh microstructure; or c) some fraction of the particles being dispersed within the mesh microstructure and some fraction of the particles being applied to the surface of the mesh microstructure. In embodiments actives may be: a) in the form of a soluble film on a top surface of the mesh microstructure; b) in the form of a soluble film on a bottom surface of the mesh microstructure; c) or in the form of a soluble film on both bottom and top surfaces of the mesh. Actives may be present as a combination of soluble films and particles. Non-limiting examples of particles are presented in FIG. 7, FIG. 8, FIG. 9, and FIG. 10.

Crystallizing Agents

Crystallizing agents selected for their ability to impart different properties on the SDC domains. The crystallizing agents are selected from the small group sodium fatty acid carboxylates having saturated chains and with chain lengths ranging from C8-C12. In this compositional range and with the described method of preparation, such sodium fatty acid carboxylates provide a fibrous mesh microstructure, ideal solubilization temperature for making and dissolution in use, and by suitable blending, the resulting solid dissolvable compositions have tunability in these properties for varied uses and conditions.

Crystallizing agents may be present in Solid Dissolvable Composition Mixtures used to create SDC domains in an amount of from about 5 wt % to about 35 wt %, about 10 wt % to about 35 wt %, or about 15 wt % to about 35 wt %. Crystallizing agents may be present in the SDC domains in an amount of from about 50 wt % to about 99 wt %, about 60 wt % to about 95 wt %, about 70 wt % to about 90 wt %. Crystallizing agents may be present in the low-water composition an amount of from about 5 wt % to about 60 wt %, about 10 wt % to about 50 wt %, about 15 wt % to about 40 wt %.

Suitable crystallizing agents include sodium octanoate (NaC8), sodium decanoate (NaC10), sodium dodecanoate or sodium laurate (NaC12) and combinations thereof.

Capsule Material

A capsule includes a shell (wall) material that encapsulates a benefit agent (benefit agent delivery capsule or just "capsule") in a core. Benefit agent may be referred herein as a "benefit agent" or an "encapsulated benefit agent". The encapsulated benefit agent is encapsulated in the core.

The capsules may be present in the composition in an amount that is from about 0.05% to about 20%, or from about 0.05% to about 10%, or from about 0.1% to about 5%, or from about 0.2% to about 2%, by weight of the composition. When discussing herein the amount or weight percentage of the capsules, it is meant the sum of the shell material and the core material.

Capsules can have a mean shell thickness of about 10 nm to about 10,000 nm, preferably about 170 nm to about 1000 nm, more preferably about 300 nm to about 500 nm.

In embodiments capsules can have a mean volume weighted capsule diameter of about 0.1 micrometers to 300 micrometers, about 0.1 to about 200 micrometers, about 1 micrometers to about 200 micrometers, about 10 micrometers to about 200 micrometers, about 10 micrometers to about 50 micrometers. It has been advantageously found that large capsules (e.g., mean diameter of about 10 μm or greater) can be provided in accordance with embodiments herein without sacrificing the stability of the capsules as a whole and/or while maintaining good fracture strength.

In embodiments capsules can have a mean volume weighted capsule diameter of about 0.1 micrometers to 300 micrometers, about 0.1 to about 200 micrometers, about 1 micrometers to about 200 micrometers, about 10 micrometers to about 200 micrometers, about 10 micrometers to about 50 micrometers. It has been advantageously found that large capsules (e.g., mean diameter of about 10 μm or greater) can be provided in accordance with embodiments herein without sacrificing the stability of the capsules as a whole and/or while maintaining good fracture strength.

It has surprisingly been found that in addition to the inorganic shell, the volumetric core-shell ratio can play an important role to ensure the physical integrity of the capsules. Shells that are too thin vs. the overall size of the capsule (core:shell ratio>98:2) tend to suffer from a lack of self-integrity. On the other hand, shells that are extremely thick vs. the diameter of the capsule (core:shell ratio<80:20) tend to have higher shell permeability in a surfactant-rich matrix. While one might intuitively think that a thick shell leads to lower shell permeability (since this parameter impacts the mean diffusion path of the active across the shell), it has surprisingly been found that the capsules of this invention that have a shell with a thickness above a threshold have higher shell permeability. It is believed that this upper threshold is, in part, dependent on the capsule diameter. Volumetric core-shell ratio is determined according to the method provided in the Test Method section below.

Permeability as measured by the Permeability Test Method described below correlates to the porosity of the capsule shells. In embodiments, the capsules or populations of capsules have a permeability as measured by the Permeability Test Method of about 0.01% to about 80%, about 0.01% to about 70%, about 0.01% to about 60%, about 0.01% to about 50%, about 0.01% to about 40%, about 0.01% to about 30%, or about 0.01% to about 20%. For example, the permeability can be about 0.01, 0.1, 0.5, 1, 2, 3, 4, 5, 6, 7, 8, 9, 10, 11, 12, 13, 14, 15, 20, 25, 30, 35, 40, 45, 50, 55, 60, 65, 70, 75, or 80%.

The capsules may have a volumetric core-shell ratio of 50:50 to 99:1, preferably from 60:40 to 99:1, preferably 70:30 to 98:2, more preferably 80:20 to 96:4.

It may be desirable to have particular combinations of these capsule characteristics. For example, the capsules can have a volumetric core-shell ratio of about 99:1 to about 50:50; and have a mean volume weighted capsule diameter of about 0.1 μm to about 200 μm, and a mean shell thickness of about 10 nm to about 10,000 nm. The capsules can have a volumetric core-shell ratio of about 99:1 to about 50:50; and have a mean volume weighted capsule diameter of about 10 μm to about 200 μm, and a mean shell thickness of about 170 nm to about 10,000 nm. The capsules can have a volumetric core-shell ratio of about 98:2 to about 70:30; and have a mean volume weighted capsule diameter of about 10 μm to about 100 μm, and a mean shell thickness of about 300 nm to about 1000 nm.

In certain embodiments, the mean volume weighted diameter of the capsule is between 1 and 200 micrometers, preferably between 1 and 10 micrometers, even more preferably between 2 and 8 micrometers. In another embodiment, the shell thickness is between 1 and 10000 nm, 1-1000 nm, 10-200 nm. In a further embodiment, the capsules have a mean volume weighted diameter between 1 and 10 micrometers and a shell thickness between 1 and 200 nm. It has been found that capsules with a mean volume weighted diameter between 1 and 10 micrometers and a shell thickness between 1 and 200 nm have a higher Fracture strength.

Without intending to be bound by theory, it is believed that the higher Fracture strength provides a better survivability during the laundering process, wherein said process can cause premature rupture of mechanically weak capsules due to the mechanical constraints in the washing machine.

Capsules having a mean volume weighted diameter between 1 and 10 micrometers and a shell thickness between 10 and 200 nm, offer resistance to mechanical constraints only when made with a certain selection of the silica precursor used. In some embodiments, said precursor has a molecular weight between 2 and 5 kDa, even more preferably a molecular weight between 2.5 and 4 kDa. In addition, the concentration of the precursor needs to be carefully selected, wherein said concentration is between 20 and 60 w %, preferably between 40 and 60 w % of the oil phase used during the encapsulation.

Without intending to be bound by theory, it is believed that higher molecular weight precursors have a much slower migration time from the oil phase into the water phase. The slower migration time is believed to arise from the combination of three phenomenon: diffusion, partitioning, and reaction kinetics. This phenomenon is important in the context of small sized capsules, due to the fact that the overall surface area between oil and water in the system increases as the capsule diameter decreases. A higher surface area leads to higher migration of the precursor from the oil phase to the water phase, which in turn reduces the yield of polymerization at the interface. Therefore, the higher molecular weight precursor may be needed to mitigate the effects brought by an in increase in surface area, and to obtain capsules according to this invention.

Methods used to produce the capsules can produce capsules having a low coefficient of variation of capsule diameter. Control over the distribution of size of the capsules can beneficially allow for the population to have improved and more uniform fracture strength. A population of capsules can have a coefficient of variation of capsule diameter of 40% or less, preferably 30% or less, more preferably 20% or less.

For capsules containing a core material to perform and be cost-effective in consumer goods applications, they should: i) be resistant to core diffusion during the shelf life of the product (e.g., low leakage or permeability); ii) have ability to deposit on the targeted surface during application and iii) be able to release the core material by mechanical shell rupture at the right time and place to provide the intended benefit for the end consumer.

The capsules described herein can have an average fracture strength of 0.1 MPa to 10 MPa, preferably 0.25 MPa to 5 MPa, more preferably 0.25 MPa to 3 MPa. Fully inorganic capsules have traditionally had poor fracture strength, whereas for the capsules described herein, the fracture strength of the capsules can be greater than 0.25 MPa, providing for improved stability and a triggered release of the benefit agent upon a designated amount of rupture stress.

The core is oil-based. The core may be a liquid at the temperature at which it is utilized in a formulated product. The core may be a liquid at and around room temperature and may comprise one or more benefit agents.

The freshness benefit agent may be at least one of: a perfume mixture or a malodor counteractant, or combinations thereof. In one aspect, perfume delivery technology may comprise benefit agent delivery capsules formed by at least partially surrounding a benefit agent with a shell material. The benefit agent may include materials selected from the group consisting of perfume raw materials such as 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, gamma-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, and beta-dihydro ionone, linalool, ethyllinalool, tetrahydrolinalool, and dihydromyrcenol; silicone oils, waxes such as polyethylene waxes; essential oils such as fish oils, jasmine, camphor, lavender;

skin coolants such as menthol, methyl lactate; vitamins such as Vitamin A and E; sunscreens; glycerine; catalysts such as manganese catalysts or bleach catalysts; bleach particles such as perborates; silicon dioxide particles; antiperspirant actives; cationic polymers and mixtures thereof. Suitable benefit agents can be obtained from Givaudan Corp. of Mount Olive, New Jersey, USA, International Flavors & Fragrances Corp. of South Brunswick, New Jersey, USA, or Firmenich Company of Geneva, Switzerland or Encapsys Company of Appleton, Wisconsin (USA). As used herein, a "perfume raw material" refers to one or more of the following ingredients: fragrant essential oils; aroma compounds; materials supplied with the fragrant essential oils, aroma compounds, stabilizers, diluents, processing agents, and contaminants; and any material that commonly accompanies fragrant essential oils, aroma compounds.

The core preferably includes a perfume raw material. The core may comprise from about 1 wt % to 100 wt % perfume, based on the total weight of the core. Preferably, the core can include 50 wt % to 100 wt % perfume based on the total weight of the core, more preferably 80 wt % to 100 wt % perfume based on the total weight of the core. Typically, higher levels of perfume are preferred for improved delivery efficiency.

The perfume raw material may comprise one or more, preferably two or more, perfume raw materials. The term "perfume raw material" (or "PRM") as used herein refers to compounds having a molecular weight of at least about 100 g/mol and which are useful in imparting an odor, fragrance, essence, or scent, either alone or with other perfume raw materials. Typical PRMs comprise inter alia alcohols, ketones, aldehydes, esters, ethers, nitrites and alkenes, such as terpene.

The PRMs may be characterized by their boiling points (B.P.) measured at the normal pressure (760 mm Hg), and their octanol/water partitioning coefficient (P), which may be described in terms of log P, determined according to the test method described in Test methods section. Based on these characteristics, the PRMs may be categorized as Quadrant I, Quadrant II, Quadrant III, or Quadrant IV perfumes, as described in more detail below. A perfume having a variety of PRMs from different quadrants may be desirable, for example, to provide fragrance benefits at different touchpoints during normal usage.

Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials.

Preferably the capsule comprises a perfume. Preferably, the perfume of the capsule comprises a mixture of at least 3, or even at least 5, or at least 7 perfume raw materials. The perfume of the capsule may comprise at least 10 or at least 15 perfume raw materials. A mixture of perfume raw materials may provide more complex and desirable aesthetics, and/or better perfume performance or longevity, for example at a variety of touchpoints. However, it may be desirable to limit the number of perfume raw materials in the perfume to reduce or limit formulation complexity and/or cost.

The perfume may comprise at least one perfume raw material that is naturally derived. Such components may be desirable for sustainability/environmental reasons. Naturally derived perfume raw materials may include natural extracts or essences, which may contain a mixture of PRMs. Such natural extracts or essences may include orange oil, lemon oil, rose extract, lavender, musk, patchouli, balsamic essence, sandalwood oil, pine oil, cedar, and the like.

The core may comprise, in addition to perfume raw materials, a pro-perfume, which can contribute to improved longevity of freshness benefits. Pro-perfumes may comprise nonvolatile materials that release or convert to a perfume material as a result of, e.g., simple hydrolysis, or may be pH-change-triggered pro-perfumes (e.g. triggered by a pH drop) or may be enzymatically releasable pro-perfumes, or light-triggered pro-perfumes. The pro-perfumes may exhibit varying release rates depending upon the pro-perfume chosen.

The core of the encapsulates of the present disclosure may comprise a core modifier, such as a partitioning modifier and/or a density modifier. The core may comprise, in addition to the perfume, from greater than 0% to 80%, preferably from greater than 0% to 50%, more preferably from greater than 0% to 30% based on total core weight, of a core modifier. The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or consist of isopropyl myristate. The modified vegetable oil may be esterified and/or brominated. The modified vegetable oil may preferably comprise castor oil and/or soy bean oil.

The shell may comprise between 90% and 100%, preferably between 95% and 100%, more preferably between 99% and 100% by weight of the shell of an inorganic material. Preferably, the inorganic material in the shell comprises a material selected from metal oxide, semi-metal oxides, metals, minerals or mixtures thereof. Preferably, the inorganic material in the shell comprises materials selected from $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper or a mixture thereof. More preferably, the inorganic material in the shell comprises a material selected from $SiO_2$, $TiO_2$, $Al_2O_3$, $CaCO_3$, or mixtures thereof, most preferably $SiO_2$.

The shell may include a first shell component. The shell may preferably include a second shell component that surrounds the first shell component. The first shell component can include a condensed layer formed from the condensation product of a precursor. As described in detail below, the precursor can include one or more precursor compounds. The first shell component can include a nanoparticle layer. The second shell component can include inorganic materials.

The inorganic shell can include a first shell component comprising a condensed layer surrounding the core and may further comprise a nanoparticle layer surrounding the condensed layer. The inorganic shell may further comprise a second shell component surrounding the first shell component. The first shell component comprises inorganic materials, preferably metal/semi-metal oxides, more preferably SiO2, TiO2 and Al2O3, or mixture thereof, and even more preferably SiO2. The second shell component comprises inorganic material, preferably comprising materials from the groups of Metal/semi-metal oxides, metals and minerals, more preferably materials chosen from the list of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, and copper, or mixture thereof, even more preferably chosen from $SiO_2$ and $CaCO_3$ or mixture thereof. Preferably, the second shell component material is of the same type of chemistry as the first shell component in order to maximize chemical compatibility.

The first shell component can include a condensed layer surrounding the core. The condensed layer can be the condensation product of one or more precursors. The one or more precursors may comprise at least one compound from the group consisting of Formula (I), Formula (II), and a mixture thereof, wherein Formula (I) is $(M^vO_zY_n)_w$, and wherein Formula (II) is $(M^vO_zY_nR^1_p)_w$. It may be preferred that the precursor comprises only Formula (I) and is free of compounds according to Formula (II), for example so as to reduce the organic content of the capsule shell (i.e., no $R^1$ groups). Formulas (I) and (II) are described in more detail below.

The one or more precursors can be of Formula (I):

$$(M^vO_zY_n)_w \quad \text{(Formula I)},$$

where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH_2$, —$NHR_2$, —$N(R^2)_2$, wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v-1), and w is from 2 to 2000.

The one or more precursors can be of Formula (I) where M is silicon. It may be that Y is —$OR^2$. It may be that n is 1 to 3. It may be preferable that Y is —$OR^2$ and n is 1 to 3. It may be that n is at least 2, one or more of Y is —$OR^2$, and one or more of Y is —OH.

$R^2$ may be $C_1$ to $C_{20}$ alkyl. $R^2$ may be $C_6$ to $C_{22}$ aryl. $R^2$ may be one or more of $C_1$ alkyl, $C_2$ alkyl, $C_3$ alkyl, $C_4$ alkyl, $C_5$ alkyl, $C_6$ alkyl, $C_7$ alkyl, and $C_8$ alkyl. $R^2$ may be $C_1$ alkyl. $R^2$ may be $C_2$ alkyl. $R^2$ may be $C_3$ alkyl. $R^2$ may be $C_4$ alkyl.

It may be that z is from 0.5 to 1.3, or from 0.5 to 1.1, 0.5 to 0.9, or from 0.7 to 1.5, or from 0.9 to 1.3, or from 0.7 to 1.3.

It may be preferred that M is silicon, v is 4, each Y is —$OR^2$, n is 2 and/or 3, and each $R^2$ is $C_2$ alkyl. The precursor can include polyalkoxysilane (PAOS). The precursor can include polyalkoxysilane (PAOS) synthesized via a hydrolytic process.

The precursor can alternatively or further include one or more of a compound of Formula (II):

$(M_vO_zY_nR^1_p)_w$ (Formula II), where M is one or more of silicon, titanium and aluminum, v is the valence number of M and is 3 or 4, z is from 0.5 to 1.6, preferably 0.5 to 1.5, each Y is independently selected from —OH, —$OR^2$, —$NH^2$, —$NHR^2$, —$N(R^2)_2$, wherein $R^2$ is selected from a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S; n is from 0 to (v-1); each $R^1$ is independently selected from the group consisting of: a $C_1$ to $C_{30}$ alkyl; a $C_1$ to $C_{30}$ alkylene; a $C_1$ to $C_{30}$ alkyl substituted with a member (e.g., one or more) selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, —C(O)O-heteroaryl, and mixtures thereof; and a $C_1$ to $C_{30}$ alkylene substituted with a member selected from the group consisting of a halogen, —$OCF_3$, —$NO_2$, —CN, —NC, —OH, —OCN, —NCO, alkoxy, epoxy, amino, mercapto, acryloyl, —C(O)OH, —C(O)O-alkyl, —C(O)O-aryl, and —C(O)O-heteroaryl; and p is a number that is greater than zero and is up to pmax, where $pmax=60/[9*Mw(R^1)+8]$, where $Mw(R^1)$ is the molecular weight of the $R^1$ group, and where w is from 2 to 2000.

$R^1$ may be a $C_1$ to $C_{30}$ alkyl substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$ (ie, C(O)OH), —C(O)O-alkyl, —C(O)O-aryl, and —C(O)O-heteroaryl. $R^1$ may be a $C_1$ to $C_{30}$ alkylene substituted with one to four groups independently selected from a halogen, —$OCF_3$, —$NO_2$, —CN, —NC, —OH, —OCN, —NCO, alkoxy, epoxy, amino, mercapto, acryloyl, $CO_2H$, —C(O)O-alkyl, —C(O)O-aryl, and —C(O)O-heteroaryl.

As indicated above, to reduce or even eliminate organic content in the first shell component, it may be preferred to reduce, or even eliminate, the presence of compounds according to Formula (II), which has R1 groups. The precursor, the condensed layer, the first shell component, and/or the shell may be free of compounds according to Formula (II).

The precursors of formula (I) and/or (II) may be characterized by one or more physical properties, namely a molecular weight (Mw), a degree of branching (DB) and a polydispersity index (PDI) of the molecular weight distribution. It is believed that selecting particular Mw and/or DB can be useful to obtain capsules that hold their mechanical integrity once left drying on a surface and that have low shell permeability in surfactant-based matrices. The precursors of formula (I) and (II) may be characterized as having a DB between 0 and 0.6, preferably between 0.1 and 0.5, more preferably between 0.19 and 0.4., and/or a Mw between 600 Da and 100000 Da, preferably between 700 Da and 60000 Da, more preferably between 1000 Da and 30000 Da. The characteristics provide useful properties of said precursor in order to obtain capsules of the present invention. The precursors of formula (I) and/or (II) can have a PDI between 1 and 50.

The condensed layer comprising metal/semi-metal oxides may be formed from the condensation product of a precursor comprising at least one compound of formula (I) and/or at least one compound of formula (II), optionally in combination with one or more monomeric precursors of metal/semi-metal oxides, wherein said metal/semi-metal oxides comprise TiO2, Al2O3 and SiO2, preferably SiO2. The monomeric precursors of metal/semi-metal oxides may include compounds of the formula $M(Y)_{V-n}R_n$ wherein M, Y and R are defined as in formula (II), and n can be an integer between 0 and 3. The monomeric precursor of metal/semi-metal oxides may be preferably of the form where M is Silicon wherein the compound has the general formula $Si(Y)_{4-n}R_n$ wherein Y and R are defined as for formula (II) and n can be an integer between 0 and 3. Examples of such monomers are TEOS (tetraethoxy orthosilicate), TMOS (tetramethoxy orthosilicate), TBOS (tetrabutoxy orthosilicate), triethoxymethylsilane (TEMS), diethoxy-dimethylsilane (DEDMS), trimethylethoxysilane (TMES), and tetraacetoxysilane (TAcS). These are not meant to be limiting the scope of monomers that can be used and it would be apparent to the person skilled in the art what are the suitable monomers that can be used in combination herein.

The first shell components can include an optional nanoparticle layer. The nanoparticle layer comprises nanoparticles. The nanoparticles of the nanoparticle layer can be one or more of $SiO_2$, $TiO_2$, $Al_2O_3$, $ZrO_2$, $ZnO_2$, $CaCO_3$, clay, silver, gold, and copper. Preferably, the nanoparticle layer can include $SiO_2$ nanoparticles.

The nanoparticles can have an average diameter between 1 nm and 500 nm, preferably between 50 nm and 400 nm.

The pore size of the capsules can be adjusted by varying the shape of the nanoparticles and/or by using a combination of different nanoparticle sizes. For example, non-spherical irregular nanoparticles can be used as they can have improved packing in forming the nanoparticle layer, which is believed to yield denser shell structures. This can be advantageous when limited permeability is required. The nanoparticles used can have more regular shapes, such as spherical. Any contemplated nanoparticle shape can be used herein.

The nanoparticles can be substantially free of hydrophobic modifications. The nanoparticles can be substantially free of organic compound modifications. The nanoparticles can include an organic compound modification. The nanoparticles can be hydrophilic.

The nanoparticles can include a surface modification such as but not limited to linear or branched $C_1$ to $C_{20}$ alkyl groups, surface amino groups, surface methacrylo groups, surface halogens, or surface thiols. These surface modifications are such that the nanoparticle surface can have covalently bound organic molecules on it. When it is disclosed in this document that inorganic nanoparticles are used, this is meant to include any or none of the aforementioned surface modifications without being explicitly called out.

The capsules of the present disclosure may be defined as comprising a substantially inorganic shell comprising a first shell component and a second shell component. By substantially inorganic it is meant that the first shell component can comprise up to 10 wt %, or up to 5 wt % of organic content, preferably up to 1 wt % of organic content, as defined later in the organic content calculation. It may be preferred that the first shell component, the second shell component, or both comprises no more than about 5 wt %, preferably no more than about 2 wt %, more preferably about 0 wt %, of organic content, by weight of the first or shell component.

While the first shell component is useful to build a mechanically robust scaffold or skeleton, it can also provide low shell permeability in products containing surfactants such as laundry detergents, shower-gels, cleansers, etc. (see Surfactants in Consumer Products, J. Falbe, Springer-Verlag). The second shell component can greatly reduce the shell permeability which improves the capsule impermeability in surfactant-based matrices. A second shell component can also greatly improve capsule mechanical properties, such as a capsule rupture force and fracture strength. Without intending to be bound by theory, it is believed that a second shell component contributes to the densification of the overall shell by depositing a precursor in pores remaining in the first shell component. A second shell component also adds an extra inorganic layer onto the surface of the capsule. These improved shell permeabilities and mechanical properties provided by the $2^{nd}$ shell component only occur when used in combination with the first shell component as defined in this invention.

Capsules of the present disclosure may be formed by first admixing a hydrophobic material with any of the precursors of the condensed layer as defined above, thus forming the oil phase, wherein the oil phase can include an oil-based and/or oil-soluble precursor. Said precursor/hydrophobic material mixture is then used as a dispersed phase in conjunction with a water phase, where an O/W (oil-in-water) emulsion is formed once the two phases are mixed and homogenized via methods that are known to the person skilled in the art. Nanoparticles can be present in the water phase and/or the oil phase, irrespective of the type of emulsion that is desired. The oil phase can include an oil-based core modifier and/or an oil-based benefit agent and a precursor of the condensed layer. Suitable core materials to be used in the oil phase are described earlier in this document.

Once the emulsion is formed, the following steps may occur:

(a) the nanoparticles migrate to the oil/water interface, thus forming the nanoparticle layer.

(b) The precursor of the condensed layer comprising precursors of metal/semi-metal oxides will start undergoing a hydrolysis/condensation reaction with the water at the oil/water interface, thus forming the condensed layer surrounded by the nanoparticle layer. The precursors of the condensed layer can further react with the nanoparticles of the nanoparticle layer.

The precursor forming the condensed layer can be present in an amount between 1 wt % and 50 wt %, preferably between 10 wt % and 40 wt % based on the total weight of the oil phase.

The oil phase composition can include any compounds as defined in the core section above. The oil phase, prior to emulsification, can include between 10 wt % to about 99 wt % benefit agent.

The second shell component can be formed by admixing capsules having the first shell component with a solution of second shell component precursor. The solution of second shell component precursor can include a water soluble or oil soluble second shell component precursor. The second shell component precursor can be one or more of a compound of formula (I) as defined above, tetraethoxysilane (TEOS), tetramethoxysilane (TMOS), tetrabutoxysilane (TBOS), triethoxymethylsilane (TEMS), diethoxy-dimethylsilane (DEDMS), trimethylethoxysilane (TMES), and tetraacetoxysilane (TAcS). The second shell component precursor can also include one or more of silane monomers of type $Si(Y)_{4-n}R_n$ wherein Y is a hydrolysable group, R is a non-hydrolysable group, and n can be an integer between 0 and 3. Examples of such monomers are given earlier in this paragraph, and these are not meant to be limiting the scope of monomers that can be used. The second shell component precursor can include salts of silicate, titanate, aluminate, zirconate and/or zincate. The second shell component precursor can include carbonate and calcium salts. The second shell component precursor can include salts of iron, silver, copper, nickel, and/or gold. The second shell component precursor can include zinc, zirconium, silicon, titanium, and/or aluminum alkoxides. The second shell component precursor can include one or more of silicate salt solutions such as sodium silicates, silicon tetralkoxide solutions, iron sulfate salt and iron nitrate salt, titanium alkoxides solutions, aluminum trialkoxide solutions, zinc dialkoxide solutions, zirconium alkoxide solutions, calcium salt solution, carbonate salt solution. A second shell component comprising $CaCO_3$ can be obtained from a combined use of calcium salts and carbonate salts. A second shell component comprising $CaCO_3$ can be obtained from Calcium salts without addition of carbonate salts, via in-situ generation of carbonate ions from $CO_2$.

The second shell component precursor can include any suitable combination of any of the foregoing listed compounds.

The solution of second shell component precursor can be added dropwise to the capsules comprising a first shell component. The solution of second shell component precursor and the capsules can be mixed together between 1 minute and 24 hours. The solution of second shell component precursor and the capsules can be mixed together at room temperature or at elevated temperatures, such as 20° C. to 100° C.

The second shell component precursor solution can include the second shell component precursor in an amount between 1 wt % and 50 wt % based on the total weight of the solution of second shell component precursor.

Capsules with a first shell component can be admixed with the solution of the second shell component precursor at a pH of between 1 and 11. The solution of the second shell precursor can contain an acid and/or a base. The acid can be a strong acid. The strong acid can include one or more of HCl, $HNO_3$, $H_2SO_4$, HBr, HI, $HClO_4$, and $HClO_3$, preferably HCl. In other embodiments, the acid can be a weak acid. In embodiments, said weak acid can be acetic acid or HF. The concentration of the acid in the second shell component precursor solution can be between $10^{-7}$M and 5M. The base can be a mineral or organic base, preferably a mineral base. The mineral base can be a hydroxide, such as sodium hydroxide and ammonia. For example, the mineral base can be about $10^{-5}$M to 0.01M NaOH, or about $10^{-5}$M to about 1M ammonia. The list of acids and bases exemplified above is not meant to be limiting the scope of the invention, and other suitable acids and bases that allow for the control of the pH of the second shell component precursor solution are contemplated herein.

The process of forming a second shell component can include a change in pH during the process. For example, the process of forming a second shell component can be initiated at an acidic or neutral pH and then a base can be added during the process to increase the pH. Alternatively, the process of forming a second shell component can be initiated at a basic or neutral pH and then an acid can be added during the process to decrease the pH. Still further, the process of forming a second shell component can be initiated at an acid or neutral pH and an acid can be added during the process to further reduce the pH. Yet further the process of forming a second shell component can be initiated at a basic or neutral pH and a base can be added during the process to further increase the pH. Any suitable pH shifts can be used. Further any suitable combinations of acids and bases can be used at any time in the solution of second shell component precursor to achieve a desired pH. The process of forming a second shell component can include maintaining a stable pH during the process with a maximum deviation of +/−0.5 pH unit. For example, the process of forming a second shell component can be maintained at a basic, acidic or neutral pH. Alternatively, the process of forming a second shell component can be maintained at a specific pH range by controlling the pH using an acid or a base. Any suitable pH range can be used. Further any suitable combinations of acids and bases can be used at any time in the solution of second shell component precursor to keep a stable pH at a desirable range.

The emulsion can be cured under conditions to solidify the precursor thereby forming the shell surrounding the core.

The reaction temperature for curing can be increased to increase the rate at which solidified capsules are obtained. The curing process can induce condensation of the precursor. The curing process can be done at room temperature or above room temperature. The curing process can be done at temperatures 30° C. to 150° C., preferably 50° C. to 120° C., more preferably 80° C. to 100° C. The curing process can be done over any suitable period to enable the capsule shell to be strengthened via condensation of the precursor material. The curing process can be done over a period from 1 minute to 45 days, preferably 1 hour to 7 days, more preferably 1 hour to 24 hours. Capsules are considered cured when they no longer collapse. Determination of capsule collapse is detailed below. During the curing step, it is believed that hydrolysis of Y moieties (from formula (I) and/or (II)) occurs, followed by the subsequent condensation of a —OH group with either another —OH group or another moiety of type Y (where the 2 Y moieties are not necessarily the same). The hydrolysed precursor moieties will initially condense with the surface moieties of the nanoparticles (provided they contain such moieties). As the shell formation progresses, the precursor moieties will react with said preformed shell.

The emulsion can be cured such that the shell precursor undergoes condensation. The emulsion can be cured such that the shell precursor reacts with the nanoparticles to undergo condensation. Shown below are examples of the hydrolysis and condensation steps described herein for silica-based shells:

Hydrolysis:

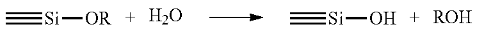

Condensation:

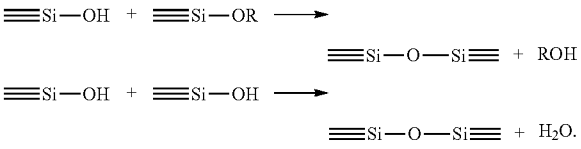

For example, when a precursor of formula (I) or (II) is used, the following describes the hydrolysis and condensation steps:

Hydrolysis

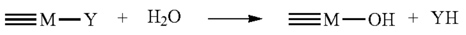

Condensation:

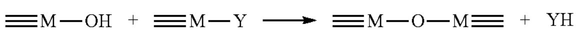

-continued

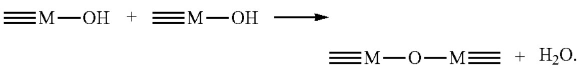

The capsules may be provided as a slurry composition (or simply "slurry" herein). The slurry can be formulated into a product, such as a consumer product.

Test Methods

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Viscosity Method

The viscosity of neat product is determined using a Brookfield® DV-E rotational viscometer, spindle 2, at 60 rpm, at about 20-21° C.

Mean Shell Thickness Measurement

The capsule shell, including the first shell component and the second shell component, when present, is measured in nanometers on twenty benefit agent containing delivery capsules making use of a Focused Ion Beam Scanning Electron Microscope (FIB-SEM; FEI Helios Nanolab 650) or equivalent. Samples are prepared by diluting a small volume of the liquid capsule dispersion (20 μl) with distilled water (1:10). The suspension is then deposited on an ethanol cleaned aluminium stub and transferred to a carbon coater (Leica EM ACE600 or equivalent). Samples are left to dry under vacuum in the coater (vacuum level: $10^{-5}$ mbar). Next 25-50 nm of carbon is flash deposited onto the sample to deposit a conductive carbon layer onto the surface. The aluminium stubs are then transferred to the FIB-SEM to prepare cross-sections of the capsules. Cross-sections are prepared by ion milling with 2.5 nA emission current at 30 kV accelerating voltage using the cross-section cleaning pattern. Images are acquired at 5.0 kV and 100 pA in immersion mode (dwell time approx. 10 μs) with a magnification of approx. 10,000.

Images are acquired of the fractured shell in cross-sectional view from 20 benefit delivery capsules selected in a random manner which is unbiased by their size, to create a representative sample of the distribution of capsules sizes present. The shell thickness of each of the 20 capsules is measured using the calibrated microscope software at 3 different random locations, by drawing a measurement line perpendicular to the tangent of the outer surface of the capsule shell. The 60 independent thickness measurements are recorded and used to calculate the mean thickness.

Mean and Coefficient of Variation of Volume-Weighted Capsule Diameter

Capsule size distribution is determined via single-particle optical sensing (SPOS), also called optical particle counting (OPC), using the AccuSizer 780 AD instrument or equivalent and the accompanying software CW788 version 1.82 (Particle Sizing Systems, Santa Barbara, California, U.S.A.), or equivalent. The instrument is configured with the following conditions and selections: Flow Rate=1 mL/sec; Lower Size Threshold=0.50 μm; Sensor Model Number=LE400-05SE or equivalent; Auto-dilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at most 9200 per mL. During a time period of 60 seconds the suspension is analyzed. The range of size used was from 1 μm to 493.3 μm.

Volume Distribution:

$$CoVv(\%) = \frac{\sigma_v}{\mu_v} * 100$$

$$\sigma v = \sum_{i=1\ um}^{493.3\ um} \left(x_{i,v} * (d_i - \mu_v)^2\right)0.5$$

$$\mu_v = \frac{\sum_{i=1\ um}^{493.3\ um} (x_{i,v} * d_i)}{\sum_{i=1\ um}^{493.3\ um} x_{i,v}}$$

where:

$CoV_v$—Coefficient of variation of the volume weighted size distribution $\sigma_v$—Standard deviation of volume-weighted size distribution $\mu_v$—mean of volume-weighted size distribution $d_i$—diameter in fraction i $x_{i,v}$—frequency in fraction i (corresponding to diameter i) of volume-weighted size distribution $$x_{i,v} = \frac{x_{i,n} * d_i^3}{\sum_{i=1\ um}^{493.3\ um} \left(x_{i,n} * d_i^3\right)}$$

Volumetric Core-Shell Ratio Evaluation

The volumetric core-shell ratio values are determined as follows, which relies upon the mean shell thickness as measured by the Shell Thickness Test Method. The volumetric core-shell ratio of capsules where their mean shell thickness was measured is calculated by the following equation:

$$\frac{\text{Core}}{\text{Shell}} = \frac{\left(1 - \frac{2 * \text{Thickness}}{D_{caps}}\right)^3}{\left(1 - \left(1 - \frac{2 * \text{Thickness}}{D_{caps}}\right)^3\right)}$$

wherein Thickness is the mean shell thickness of a population of capsules measured by FIBSEM and the $D_{caps}$ is the mean volume weighted diameter of the population of capsules measured by optical particle counting.

This ratio can be translated to fractional core-shell ratio values by calculating the core weight percentage using the following equation:

$$\%\ \text{Core} = \left(\frac{\frac{\text{Core}}{\text{Shell}}}{1 + \frac{\text{Core}}{\text{Shell}}}\right) * 100$$

and shell percentage can be calculated based on the following equation:

$$\%\ \text{Shell} = 100 - \%\ \text{Core}.$$

Degree of Branching Method

The degree of branching of the precursors was determined as follows: Degree of branching is measured using (29Si) Nuclear Magnetic Resonance Spectroscopy (NMR).

Sample Preparation

Each sample is diluted to a 25% solution using deuterated benzene (Benzene-D6 "100%" (D, 99.96% available from Cambridge Isotope Laboratories Inc., Tewksbury, MA, or equivalent). 0.015M Chromium(III) acetylacetonate (99.99% purity, available from Sigma-Aldrich, St. Louis, MO, or equivalent) is added as a paramagnetic relaxation reagent. If glass NMR tubes (Wilmed-LabGlass, Vineland, NJ or equivalent) are used for analysis, a blank sample must also be prepared by filling an NMR tube with the same type of deuterated solvent used to dissolve the samples. The same glass tube must be used to analyze the blank and the sample.

Sample Analysis

The degree of branching is determined using a Bruker 400 MHz Nuclear Magnetic Resonance Spectroscopy (NMR) instrument, or equivalent. A standard silicon (29Si) method (e.g. from Bruker) is used with default parameter settings with a minimum of 1000 scans and a relaxation time of 30 seconds.

Sample Processing

The samples are stored and processed using system software appropriate for NMR spectroscopy such as MestReNova version 12.0.4-22023 (available from Mestrelab Research) or equivalent. Phase adjusting and background correction are applied. There is a large, broad, signal present that stretches from −70 to −136 ppm which is the result of using glass NMR tubes as well as glass present in the probe housing. This signal is suppressed by subtracting the spectra of the blank sample from the spectra of the synthesized sample provided that the same tube and the same method parameters are used to analyze the blank and the sample. To further account for any slight differences in data collection, tubes, etc., an area outside of the peaks of interest area should be integrated and normalized to a consistent value. For example, integrate −117 to −115 ppm and set the integration value to 4 for all blanks and samples.

The resulting spectra produces a maximum of five main peak areas. The first peak (Q0) corresponds to unreacted TAOS. The second set of peaks (Q1) corresponds to end groups. The next set of peaks (Q2) correspond to linear groups. The next set of broad peaks (Q3) are semi-dendritic units. The last set of broad peaks (Q4) are dendritic units. When PAOS and PBOS are analyzed, each group falls within a defined ppm range. Representative ranges are described in the following table:

| Group ID | # of Bridging Oxygen per Silicon | ppm Range |
|---|---|---|
| Q0 | 0 | −80 to −84 |
| Q1 | 1 | −88 to −91 |
| Q2 | 2 | −93 to −98 |
| Q3 | 3 | −100 to −106 |
| Q4 | 4 | −108 to −115 |

Polymethoxysilane has a different chemical shift for Q0 and Q1, an overlapping signal for Q2, and an unchanged Q3 and Q4 as noted in the table below:

| Group ID | # of Bridging Oxygen per Silicon | ppm Range |
|---|---|---|
| Q0 | 0 | −78 to −80 |
| Q1 | 1 | −85 to −88 |
| Q2 | 2 | −91 to −96 |
| Q3 | 3 | −100 to −106 |
| Q4 | 4 | −108 to −115 |

The ppm ranges indicated in the tables above may not apply to all monomers. Other monomers may cause altered chemical shifts, however, proper assignment of Q0-Q4 should not be affected.

Using MestReNova, each group of peaks is integrated, and the degree of branching can be calculated by the following equation:

$$\text{Degree of Branching} = (1/4) * \frac{3 * Q3 + 4 * Q4}{Q1 + Q2 + Q3 + Q4}$$

Molecular Weight and Polydispersity Index Determination Method

The molecular weight (Polystyrene equivalent Weight Average Molecular Weight (Mw)) and polydispersity index (Mw/Mn) of the condensed layer precursors described herein are determined using Size Exclusion Chromatography with Refractive Index detection. Mn is the number average molecular weight.

Sample Preparation

Samples are weighed and then diluted with the solvent used in the instrument system to a targeted concentration of 10 mg/mL. For example, weigh 50 mg of polyalkoxysilane into a 5 mL volumetric flask, dissolve and dilute to volume with toluene. After the sample has dissolved in the solvent, it is passed through a 0.45 um nylon filter and loaded into the instrument autosampler.

Sample Analysis

An HPLC system with autosampler (e.g. Waters 2695 HPLC Separation Module, Waters Corporation, Milford MA, or equivalent) connected to a refractive index detector (e.g. Wyatt 2414 refractive index detector, Santa Barbara, CA, or equivalent) is used for polymer analysis. Separation is performed on three columns, each 7.8 mm I.D.×300 mm in length, packed with 5 μm polystyrene-divinylbenzene media, connected in series, which have molecular weight cutoffs of 1, 10, and 60 kDA, respectively. Suitable columns are the TSKGel G1000HHR, G2000HHR, and G3000HHR columns (available from TOSOH Bioscience, King of Prussia, PA) or equivalent. A 6 mm I.D.×40 mm long 5 μm polystyrene-divinylbenzene guard column (e.g. TSKgel Guardcolumn HHR-L, TOSOH Bioscience, or equivalent) is used to protect the analytical columns. Toluene (HPLC grade or equivalent) is pumped isocratically at 1.0 mL/min, with both the column and detector maintained at 25° C. 100 μL of the prepared sample is injected for analysis. The sample data is stored and processed using software with GPC calculation capability (e.g. ASTRA Version 6.1.7.17 software, available from Wyatt Technologies, Santa Barbara, CA or equivalent.)

The system is calibrated using ten or more narrowly dispersed polystyrene standards (e.g. Standard ReadyCal Set, (e.g. Sigma Aldrich, PN 76552, or equivalent) that have known molecular weights, ranging from about 0.250-70 kDa and using a third order fit for the Mp verses Retention Time Curve.

Using the system software, calculate and report Weight Average Molecular Weight (Mw) and PolyDispersity Index (Mw/Mn).

Method of Calculating Organic Content in First Shell Component

As used herein, the definition of organic moiety in the inorganic shell of the capsules according to the present disclosure is: any moiety X that cannot be cleaved from a metal precursor bearing a metal M (where M belongs to the group of metals and semi-metals, and X belongs to the group of non-metals) via hydrolysis of the M-X bond linking said moiety to the inorganic precursor of metal or semi-metal M and under specific reaction conditions, will be considered as organic. A minimal degree of hydrolysis of 1% when exposed to neutral pH distilled water for a duration of 24 h without stirring, is set as the reaction conditions.

This method allows one to calculate a theoretical organic content assuming full conversion of all hydrolysable groups. As such, it allows one to assess a theoretical percentage of organic for any mixture of silanes and the result is only indicative of this precursor mixture itself, not the actual organic content in the first shell component. Therefore, when a certain percentage of organic content for the first shell component is disclosed anywhere in this document, it is to be understood as containing any mixture of unhydrolyzed or pre-polymerized precursors that according to the below calculations give a theoretical organic content below the disclosed number.

Example for Silane (but not Limited Thereto; See Generic Formulas at the End of the Document):

Consider a mixture of silanes, with a molar fraction $Y_i$ for each, and where i is an ID number for each silane. Said mixture can be represented as follows:

$$Si(XR)_{4-n}R_n$$

where XR is a hydrolysable group under conditions mentioned in the definition above, $R^i_{ni}$ is non-hydrolyzable under conditions mentioned above and $n_i$=0, 1, 2 or 3.

Such a mixture of silanes will lead to a shell with the following general formula:

$$SiO_{\frac{(4-n)}{2}}R_n$$

Then, the weight percentage of organic moieties as defined earlier can be calculated as follows:

1) Find out Molar fraction of each precursor (nanoparticles included)
2) Determine general formula for each precursor (nanoparticles included)
3) Calculate general formula of precursor and nanoparticle mixture based on molar fractions
4) Transform into reacted silane (all hydrolysable groups to oxygen groups)
5) Calculate weight ratio of organic moieties vs. total mass (assuming 1 mole of Si for framework)

EXAMPLE

| Raw material | Formula | Mw (g/mol) | weight (g) | amount (mmol) | Molar fraction |
|---|---|---|---|---|---|
| Sample AY | $SiO(OEt)_2$ | 134 | 1 | 7.46 | 0.57 |
| TEOS | $Si(OEt)_4$ | 208 | 0.2 | 0.96 | 0.07 |
| DEDMS | $Si(OEt)_2Me_2$ | 148.27 | 0.2 | 1.35 | 0.10 |
| SiO2 NP | $SiO_2$ | 60 | 0.2 | 3.33 | 0.25 |

To calculate the general formula for the mixture, each atoms index in the individual formulas is to be multiplied by their respective molar fractions. Then, for the mixture, a sum of the fractionated indexes is to be taken when similar ones occur (typically for ethoxy groups).

Note: Sum of all Si fractions will always add to 1 in the mixture general formula, by virtue of the calculation method (sum of all molar fractions for Si yields 1).

$$SiO_{1*0.57+2*0.25}(OEt)_{2*0.57+4*0.07+2*0.10}Me_{2*0.10}$$

$$SiO_{1.07}(OEt)_{1.62}Me_{0.20}$$

To transform the unreacted formula to a reacted one, simply divide the index of ALL hydrolysable groups by 2, and then add them together (with any pre-existing oxygen groups if applicable) to obtain the fully reacted silane.

$$SiO_{1.88}Me_{0.20}$$

In this case, the expected result is $SiO_{1.9}Me_{0.2}$, as the sum of all indexes must follow the following formula:

$$A+B/2=2,$$

where A is the oxygen atom index and B is the sum of all non-hydrolysable indexes. The small error occurs from rounding up during calculations and should be corrected. The index on the oxygen atom is then readjusted to satisfy this formula.

Therefore, the final formula is $SiO_{1.9}Me_{0.2}$, and the weight ratio of organic is calculated below:

$$\text{Weight ratio} = (0.20*15)/(28+1.9*16+0.20*15) = 4.9\%$$

General Case:

The above formulas can be generalized by considering the valency of the metal or semi-metal M, thus giving the following modified formulas:

$$M(XR)_{V-ni}R^{i}_{ni}$$

and using a similar method but considering the valency V for the respective metal.

Benefit Agent Permeability Test

The permeability test method allows the determination of a percentage of diffusion of a specific molecule from the capsule core for a population of capsules into the continuous phase, which can be representative of the permeability of the capsule shells. The permeability test method is a referential frame that relates to shell permeability for a specific molecular tracer, hence fixing its size and its affinity towards the continuous phase exterior to the capsule shell. This is a referential frame that is used to compare the permeability of various capsules in the art. When both molecular tracer and continuous phase are fixed, the shell permeability is the single capsule property being assessed under a specific set of conditions.

The capsule shell permeability which correlates with shell porosity, such that low permeability is indicative of low shell porosity.

Capsule permeability is generally given as a function of parameters, such as the shell thickness, concentration of active within the core, solubility of the active in the core, the shell and the continuous phase, etc.

For diffusion of an active to occur across a shell, it must be transferred from the core into the shell, and from the shell into the continuous phase. This latter step is rapid if the solubility of the active in the continuous phase is highly favored, which is the case of hydrophobic materials into a surfactant-based matrix. For example, an active that is present at levels of 0.025 w % in a system is very likely to be fully solubilized into 15 w % of surfactants.

Considering the above, the limiting step to allow for minimal shell permeability for an active in a surfactant-based matrix, is to limit the diffusion across the shell. For hydrophobic shell materials, a hydrophobic active is readily soluble in the shell in case it can be swollen by said active. This swellability can be limited by high shell crosslink densities.

For hydrophilic shell materials, such as silicon dioxide, a hydrophobic material has limited solubility in the shell itself. Nevertheless, an active is capable of rapidly diffusing out when considering the following factors: surfactant molecules and micelles are capable of diffusing into the shell, and subsequently into the core itself, which allows for a pathway from the core into the shell and finally the exterior matrix.

Therefore, in the case of hydrophilic shell materials, a high shell crosslink density is required, but also reduced quantity of pores within the shell. Such pores can lead to fast mass transfer of an active into a surfactant-based matrix. Thus, there is a clear and obvious link between the overall permeability of a capsule shell and its porosity. In fact, the permeability of a capsule gives insight into the overall shell architecture of any given capsule.

As discussed previously, diffusion of an active is defined by the nature of the active, its solubility in the continuous phase, and the shell architecture (porosity, crosslink density and any general defects it might contain). Therefore, by fixing two of the three relevant parameters, we can in effect compare the permeability of various shells.

The purpose of this permeability test is to provide such a framework that allows for direct comparisons of different capsule shells. Moreover, it allows for the evaluation of the properties of a large population of capsules and therefore does not suffer from skewed results obtained by outliers.

Therefore, the capsule permeability can be defined via the fraction of a given molecular tracer that diffused into a given continuous phase within a given period of time under specific conditions (e.g. 20% tracer diffusion within 7 days).

Capsules of this invention will have a relative permeability as measured by the Permeability Test Method of less than about 80%, less than about 70%, less than about 60%, less than about 50%, less than about 40%, less than about 30%, or less than about 20%.

The Permeability Test Method determines the shell permeability for a molecular tracer, Verdyl Acetate (CAS #5413-60-5) (Vigon) from capsules containing the tracer in their core relative to reference sample representing complete diffusion of the said tracer (e.g. 100% permeability).

First, capsules are prepared according to any given capsules preparation method. For purposes of the Permeability Test method the capsule core must include or be supplemented during preparation to include at least 10% by weight of the core of the Verdyl Acetate tracer. The "weight of the core" in this test refers to the weight of the core after the shell has been formed and the capsule is made. The capsule core otherwise includes its intended components such as core modifiers and benefit agents. Capsules can be prepared as a capsule slurry as is commonly done in the art.

The capsules are then formulated into a Permeability Test sample. The Permeability Test sample includes mixing enough of the capsule slurry with an aqueous solution of sodium dodecyl sulfate (CAS #151-21-3) to achieve a total core oil content of 0.25 wt %±0.025% and a SDS concentration of 15 wt %±1 wt % based on the total weight of the test sample. The amount of capsules slurry needed can be calculated as follows:

$$\frac{\text{Mass (slurry)} * \textit{OilActivity}\text{(slurry)}}{\text{Mass } (\textit{SDS} \text{ solution}) + \text{Mass (Slurry)}} = 0.2500 \text{ wt } \%$$

where the OilActivity of the slurry is the wt % of oil in the slurry as determined via the mass balance of the capsule making process.

The SDS solution can be prepared by dissolving SDS pellets in deionized water. The capsules and the SDS solution can be mixed under conditions designed to prevent breakage of the capsules during mixing. For example, the capsules and the SDS solution can be mixed together by hand or with an overhead mixer, but should not be mixed with a magnetic stir bar. It has been found that mixing by magnetic stir bar often leads to breakage of the capsules. Suitable mixers can include an IKA propeller type mixer, at no more than 400 rpm, wherein the total mass of the mixture including SDS solution and capsule slurry is from 10 g to 50 g. Other suitable mixing equipment and suitable conditions for mixing without use of magnetic stir bars and without breakage a given capsules composition would be readily apparent to the skilled person.

Once prepared, the Permeability Test sample is placed in a glass vial having a total volume of no more than two times the volume of the Permeability Test sample and sealed with an airtight lid. The sealed Permeability Test sample is stored at 35° C. and 40% relative humidity for seven days. During storage, the sealed Permeability Test sample is not exposed to light and is not opened at any point prior to measurement.

A reference sample representing 100% diffusion is also prepared. The reference sample is prepared to be ready on the day of measurement (i.e., seven days after preparation of the Permeability Test sample.) The reference sample is prepared by combining a free oil mixture intended to duplicate the composition of the core of the capsules as determined by mass balance of the capsule making in the Permeability Test sample, including the same percentage by weight of the core of the Verdyl Acetate tracer, with 15% by weight aqueous SDS. The free oil mixture and the SDS solution are homogenized with a magnetic stirrer until complete solubilization of the free oil mixture, and the vessel should be sealed during mixing to avoid evaporation of the tracer. If the homogenization takes considerable time, this must be considered and the starting of the preparation of the reference can be started before day 7 if necessary. Immediately after solubilization, the reference sample is placed into a glass vial no more than two times the volume of the reference sample and sealed with an airtight lid. The SDS solution can be prepared as in the Permeability Test sample by dissolving SDS pellets in deionized water.

The amount of free oil mixture is added to achieve a total concentration of free oil mixture in the reference sample of 0.25 wt %±0.025% based on the total weight of the reference sample, as calculated by the following:

$$\frac{\text{Mass (Capsule core)}}{\text{Mass } (\textit{SDS} \text{ solution}) + \text{Mass (Capsule core)}} = 0.2500 \; w \; \%$$

Permeability, as represented by a gas chromatography area count of the Verdyl Acetate, is analyzed for the Permeability Test sample (after seven days) and the reference sample on the same day using the same GC/MS analysis equipment. In particular, for each sample, test and reference, aliquots of 100 μL, of sample are transferred to 20 ml headspace vials (Gerstel SPME vial 20 ml, part no. 093640-035-00) and immediately sealed (sealed with Gerstel Crimp caps for SPME, part no. 093640-050-00). Three headspace vials are prepared for each sample. The sealed headspace vials are then allowed to equilibrate. Samples reach equilibrium after 3 hours at room temperature, but can be left to sit longer without detriment or change to the results, up until 24 hours after sealing the headspace vial. After equilibrating, the samples are analyzed by GC/MS.

GS/MS analysis are performed by sampling the headspace of each vial via SPME (50/30 μm DVB/Carboxen/PDMS, Sigma-Aldrich part #57329-U), with a vial penetration of 25 millimeters and an extraction time of 1 minute at room temperature. The SPME fiber is subsequently on-line thermally desorbed into the GC injector (270° C., splitless mode, 0.75 mm SPME Inlet liner (Restek, art #23434) or equivalent, 300 seconds desorption time and injector penetration of 43 millimeters. Verdyl acetate is analyzed by fast GC/MS in full scan mode. Ion extraction of the specific mass for Verdyl Acetate (m/z=66) is used to calculate the Verdyl Acetate (and isomers) headspace response (expressed in area counts). The headspace responses for the Permeability Test sample and the reference sample are referenced herein as Verdyl Acetate Area Count for Permeability Test Sample and Verdyl Acetate Area Count for Reference Sample, respectively.

Suitable equipment for use in this method includes Agilent 7890B GC with 5977MSD or equivalent, Gerstel MPS, SPME (autosampler), GC column: Agilent DB-5UI 30 m×0.25×0.25 column (part #122-5532UI).

Analysis of the Permeability Test sample and the reference sample should be done on the same equipment, under the same room temperature conditions, and on the same day, each immediately after the other one Based on the GC/MS data and the actual known content of Verdyl Acetate in the Permeability Test sample, the percent permeability can be calculated. The actual content of Verdyl Acetate in the Permeability Test must be determined to correct for any losses during the making of the capsules. The method to be used is specified below. This accounts for inefficiencies often encountered when encapsulating products in a capsule core, and less than the entire anticipated amount of Verdyl Acetate present during formation of the capsules being present in the slurry (e.g. evaporation). The following equation can be used to calculate the percent permeability.

$$\frac{\text{Verdyl Acetate Area Count for Leakage Test Sample}}{\text{Verdyl Acetate Area Count for Reference Sample}} *$$

-continued $$\frac{100\%}{\text{wt \% Verdyl Acetate Actual}} * \frac{\text{oil \% Reference}}{\text{oil \% sample}} = \%\ \text{permeability}$$

This calculated value is the % permeability of the tested capsules after 7 days of storage at 40% relative humidity and 35° C.

To evaluate the actual Verdyl Acetate content in the SDS capsule mixture, an aliquot must be retrieved after the specified storage time. For this, the resulting mixture is to be opened on the same day as the first samples are measured, thus ensuring that the vial stays sealed during storage. First, the mixture must be mixed until homogeneous, so that a representative aliquot containing the right proportions of materials is retrieved. Then, 1 gram of said homogeneous mixture is introduced into a flat bottom glass vial of a diameter of 1 cm, and a magnetic stirring bar of a length of no less than half the diameter of the vial is introduced into said vial. The homogeneous mixture in the specified jar containing the magnetic stirbar is sealed and then placed onto a magnetic stirring plate, and a mixing of 500 rpm is used so that the stirring action of the stirbar grinds all capsules. This results in total release of the encapsulated core material into the surrounding SDS solution, thus allowing for the measurement of the actual VerdylAcetate content. The measurement protocol of this content must be performed as for the unbroken capsules. In addition, prior to the measurement step, the capsules must be observed under an optical microscope to assess whether all capsules have been broken. If this is not the case, the capsule grinding must be repeated, with either increasing the mixing speed and/or the mixing time.

Neat Perfume Materials

The solid dissolvable composition may include unencapsulated perfume comprising one or more perfume raw materials that solely provide a hedonic benefit (i.e., that do not neutralize malodors yet provide a pleasant fragrance). Suitable perfumes are disclosed in U.S. Pat. No. 6,248,135. For example, the solid dissolvable composition may include a mixture of volatile aldehydes for neutralizing a malodor and hedonic perfume aldehydes.

Aqueous Phase

The aqueous phase present in the Solid Dissolvable Composition Mixtures and the Solid Dissolvable Compositions, is composed of an aqueous carrier of water and optionally other minors including sodium chloride.

The aqueous phase may be present in the Solid Dissolvable Composition Mixtures in an amount of from about 65 wt % to 95 wt %, about 65 wt % to about 90 wt %, about 65 wt % to about 85 wt %, by weight of a rheological solid that is formed as an intermediate composition after crystallization of the Solid Dissolvable Composition Mixture. The aqueous phase may be present in the Solid Dissolvable Composition in an amount of 0 wt % to about 10 wt %, 0 wt % to about 9 wt %, 0 wt % to about 8 wt %, or about 5 wt %, by weight of the intermediate rheological solid.

Sodium chloride in aqueous phase Solid Dissolvable Composition Mixtures may be present between 0 wt % to about 10 wt %, between 0 wt % to about 5 wt %, or between 0 wt % to about 1 wt %. Sodium chloride in Solid Dissolvable Compositions may be present between 0 wt % to about 50 wt %, between 0 wt % to about 25 wt %, or between 0 wt % to about 5 wt %. In embodiments the SDC may contain less than 2 wt % sodium chloride, to ensure humidity stability.

SDC Domains

Solid dissolvable composition domains are primarily composed of the solid dissolvable composition, described here within.

In one embodiment, SDC domains contain less than about 13 wt %; in another embodiment, SDC domains contain between about 10 wt % and 1 wt % neat perfume; in another embodiment SDC domains contain between about 8 wt % and 2 wt % neat perfume, as exemplified as "% Freshness Agent (dry)" in the examples.

In one embodiment, SDC domains contain less than about 16 wt %; in another embodiment SDC domains contain between about 15 wt % and 1 wt % perfume capsules; in another embodiment SDC domains contain between about 15 wt % and 2 wt % perfume; in another embodiment SDC domains contain between about 15 wt % and 5 wt % perfume capsules, as exemplified as "% Freshness Agent (dry)" in the examples.

PEGC Domains

Polyethylene glycol (PEG) materials are preferred carrier materials of the non-porous dissolvable solid structure domains of the present invention. PEG materials generally have a relatively low cost, may be formed into many different shapes and sizes, dissolve well in water, and liquefy at elevated temperatures. PEG materials come in various molecular weights. In the consumer product compositions of the present invention, the PEG carrier materials have a molecular weight of from about 200 to about 50,000 Daltons, preferably from about 500 to about 20,000 Daltons, preferably from about 1,000 to about 15,000 Daltons, preferably from about 1,500 to about 12,000 Daltons, alternatively from about 6,000 to about 10,000 Daltons, and combinations thereof. Suitable PEG carrier materials include material having a molecular weight of about 8,000 Daltons, PEG material having a molecular weight of about 400 Daltons, PEG material having a molecular weight of about 20,000 Dalton, or mixtures thereof. Suitable PEG carrier materials are commercially available from BASF under the trade name PLURIOL®, such as PLURIOL® E 8000

In one embodiment, PEGC domains contain less than about 30 wt %; in another embodiment, PEGC domains contain between 15 wt % and 1 wt % neat perfume; in another embodiment, PEGC domains contain between 12 wt % and 2 wt % neat perfume; in another embodiment, PEGC domains contain between 12 wt % and 5 wt % neat perfume; in another embodiment, PEGC domains contain between 10 wt % and 2 wt % neat perfume, as exemplified as "% Freshness Agent" in the examples.

In one embodiment, PEGC domains contain less than about 2 wt %; in another embodiment, PEGC domains contain between 1.5 wt % and 0.1 wt % perfume capsules; in another embodiment, PEGC domains contain between 1.25 wt % and 0.2 wt % perfume capsules; in another embodiment, PEGC domains contain between 1.25 wt % and 0.5 wt % perfume capsules, as exemplified as "% Freshness Agent" in the examples.

Particles

Particle compositions can vary depending on the need for the low-water composition.

As non-limiting examples, where particles are composed substantially of one domain. In one embodiment, the freshness benefit agent (or "benefit agent") is perfume capsules dispersed primarily in a particle composed of SDC; in another embodiment, the freshness benefit agent is neat perfumes dispersed primarily in a particle composed of SDC; in one embodiment, the freshness benefit agent is perfume capsules dispersed primarily in a particle composed of PEGC; in another embodiment, the freshness benefit agent is neat perfumes dispersed primarily in a particle composed of PEGC; in one embodiment, the freshness benefit agent comprises perfume capsules and neat perfume dispersed primarily in a particle composed of SDC; in one embodiment, the freshness benefit agent is perfume capsules and neat perfume dispersed primarily in a particle composed of PEGC.

Figure 7:
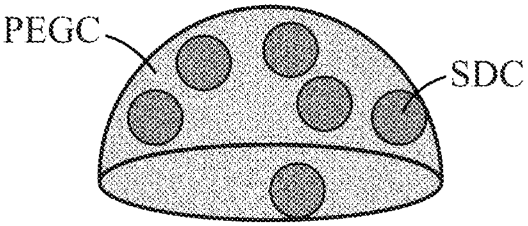
FIG. 7 Is an illustration of a particle in a Low-Water Composition, as described in Example 1.

As non-limiting examples, where particles are composed of two or more domains. In these cases, the SDC are small and completely enclosed in the PEGC domain. In one embodiment, the freshness benefit agent is perfume capsules dispersed primarily in a particle composed of SDC domain, which are dispersed in PEGC domain (FIG. 7, Example 1); In another embodiment, the freshness benefit agent is perfume capsules dispersed primarily in a particle composed of SDC domain, which are dispersed in PEGC domain containing neat perfume. In another embodiment, the freshness benefit agent is neat perfume dispersed primarily in a particle composed of SDC domain, which are dispersed in PEGC domain containing perfume capsules. Typical particles contain less than about 50 wt % SDC domains; in another embodiment between about 45 wt % and 10 wt % SDC domains; in another embodiment between about 40 wt % and 15 wt % SDC domains; in another embodiment between about 35 wt % and 20 wt % SDC domains.

Figure 8:
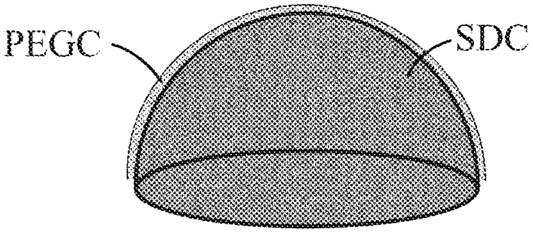
FIG. 8 Is an illustration of a particle in a Low-Water Composition, as described in Example 2.

As non-limiting examples, where particles are composed of two or more domains. In these cases, the particle has a core of a single SDC domain coated and completely enclosed in a coating of PEGC domain. In one embodiment, the freshness benefit agent is perfume capsules dispersed primarily in a particle composed of SDC domain, which are dispersed in PEGC domain (FIG. 8, Example 2); In another embodiment, the freshness benefit agent is perfume capsules dispersed primarily in a particle composed of SDC domain, which are dispersed in PEGC domain containing neat perfume. In another embodiment, the freshness benefit agent is net perfume dispersed primarily in a particle composed of SDC domain, which are dispersed in PEGC domain containing perfume capsules. Typical particles contain less than about 90 wt % SDC domains; in another embodiment, between about 80 wt % and 40 wt % SDC domains; in another embodiment, between about 80 wt % and 50 wt % SDC domains; in another embodiment, between about 50 wt % and 35 wt % SDC domains.

Figure 9:
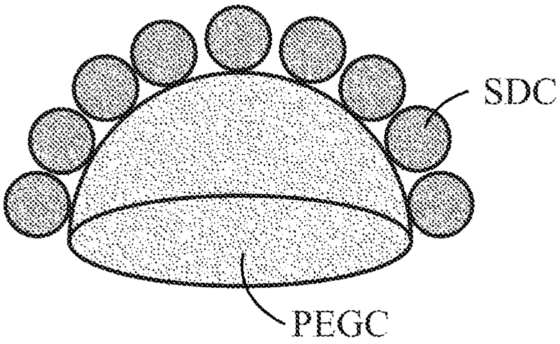
FIG. 9 Is an illustration of a particle in a Low-Water Composition, as described in Example 3.

As non-limiting examples, where particles are composed of two or more domains. In these cases, the particle has a core of a PEGC domain and sprinkled with SDC domains. In one embodiment, the freshness benefit agent is perfume capsules dispersed primarily in a particle composed of SDC domain, which are dispersed in PEGC domain (FIG. 9, Example 3); In another embodiment, the freshness benefit agent is perfume capsules dispersed primarily in a particle composed of SDC domain, which are dispersed in PEGC domain containing neat perfume. In another embodiment, the freshness benefit agent is neat perfume dispersed primarily in a particle composed of SDC domain, which are dispersed in PEGC domain containing perfume capsules. Typical particles contain less than 25 wt %; in another embodiment, between about 20 wt % and 2 wt % SDC domains; in another embodiment, between about 15 wt % and 5 wt % SDC domains.

Figure 10:
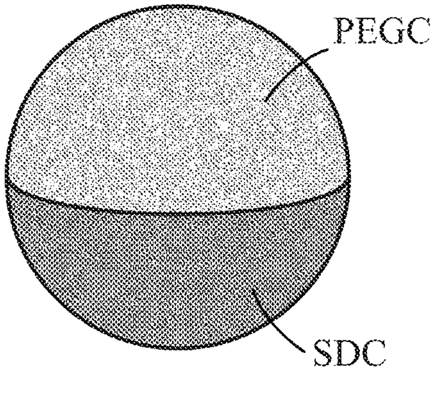
FIG. 10 Is an illustration of a particle in a Low-Water Composition, as described in Example 4.

As non-limiting examples, where particles are composed of two or more domains. In these cases, the particle has one side containing PEGC domain and one side containing SDC domain. In one embodiment, the freshness benefit agent is perfume capsules dispersed primarily in a particle composed of SDC domain, which are dispersed in PEGC domain (FIG. 10, Example 4); In another embodiment, the freshness benefit agent is perfume capsules dispersed primarily in a particle composed of SDC domain, which are dispersed in PEGC domain containing neat perfume. In another embodiment, the freshness benefit agent is neat perfume dispersed primarily in a particle composed of SDC domain, which are dispersed in PEGC domain containing perfume capsules. Typical particles contain between about 75 wt % and 25 wt % SDC domains; in another embodiment, between 70 wt % and 30 wt % SDC domains; in another embodiment, between 60 wt % and 40 wt % SDC domains.

In embodiments, particles of the low-water composition have a shape, which may include hemi-spheres, plates, cubes, cashew, gummi bears, tubes, and spheres. In another embodiment, the particles have the longest dimension of 3 cm. In another embodiment, the particles have a mean weight less than about 1,000 mg, between about 750 mg and 1 mg, and between about 500 mg and 5 mg.

Low-Water Compositions

Low-water compositions are composed of one or more particle(s) and contain at least one SDC domain and at least on PEGC (Example 5).

SDC domains may represent between about 10 wt % to about 90 wt %, or between about 10 wt % to about 70 wt %, or between about 30 wt % to about 90 wt %, or between about 40 wt % to about 60 wt %, of the low-water compositions, when summed over all particles. PEGC domains may represent between about 10 wt % to about 90 wt %, or between about 10 wt % to about 70 wt %, or between about 30 wt % to about 90 wt %, or between about 40 wt % to about 60 wt %, of the low-water compositions, when summed over all particles.

Consumer Product Compositions

In one embodiment, the consumer product is added directly into the wash drum, at the start of the wash; in another embodiment, the consumer product is added to the fabric enhancer cup in the washer; in another embodiment, the consumer product is added at the start of the wash; in another embodiment, the consumer product is added during the wash.

In one embodiment, the consumer product is sold in paper packaging, due to the Hydration and Temperature Stability of the composition; in one embodiment, the consumer product is sold in unit dose packaging; in one embodiment, the consumer product is sold with different colored particles; in one embodiment, the consumer product is sold in a sachet; in one embodiment, the consumer product is sold with different colored particles; in one embodiment, the consumer product is sold in a recyclable container.

Dissolution Test Method

All samples and procedures are maintained at room temperature (25±3° C.) prior to testing and are placed in a desiccant chamber (0% RH) for 24 hours, or until they come to a constant weight.

All dissolution measurements are done at a controlled temperature and a constant stir rate. A 600-mL jacketed beaker (Cole-Palmer, item #UX-03773-30, or equivalent) is attached and cooled to temperature by circulation of water through the jacketed beaker using a water circulator set to a desired temperature (Fisherbrand Isotemp 4100, or equivalent). The jacketed beaker is centered on the stirring element of a VWR Multi-Position Stirrer (VWR North American, West Chester, Pa., U.S.A. Cat. No. 12621-046). 100 mL of deionized water (MODEL 18 MS), or equivalent) and stirring bar (VWR, Spinbar, Cat. No. 58947-106, or equivalent)

is added to a second 150-mL beaker (VWR North American, West Chester, Pa., U.S.A. Cat. No. 58948-138, or equivalent). The second beaker is placed into the jacketed beaker. Enough Millipore water is added to the jacketed beaker to be above the level of the water in the second beaker, with great care so that the water in the jacket beaker does not mix with the water in the second beaker. The speed of the stir bar is set to 200 RPM, enough to create a gentle vortex. The temperature is set in the second beaker using the flow from the water circulator to reach 25° C. or 37° C., with relevant temperature reported in the examples. The temperature in the second beaker is measured with a thermometer before doing a dissolution experiment.

All samples were sealed in a desiccator prepared with fresh desiccant (VWR, Desiccant-Anhydrous Indicating Drierite, stock no. 23001, or equivalent) until reaching a constant weight. All tested samples have a mass less than 15 mg.

A single dissolution experiment is done by removing a single sample from the desiccator. The sample is weighed within one minute after removing it from the desiccator to measure an initial mass ($M_I$). The sample is dropped into the second beaker with stirring. The sample is allowed to dissolve for 1 minute. At the end of the minute, the sample is carefully removed from the deionized water. The sample is placed again in the desiccator until reaching a constant final mass. The percentage of mass loss for the sample in the single experiment is calculated as $M_L=100*(M_I-M_F)/M_I$.

Nine additional dissolution experiments are done, by first replacing the 100 ml of water with a new charge of deionized water, adding a new sample from the desiccator for each experiment and repeating the dissolution experiment described in the previous paragraph.

The average percent of mass loss ($M_A$) for the Test is calculated as the average percent of mass loss for the ten experiments and the average standard deviation of mass loss ($SD_A$) is the standard deviation of the mean percent of mass loss for the ten experiments.

The method returns three values: 1) the average mass of the sample ($M_S$), 2) the temperature at which the samples are dissolved (T), and 3) the average percent of mass loss ($M_A$). The method returns 'NM' for all values if the method was not performed on the sample. The average percent of mass loss ($M_A$) and the average standard deviation of the mean percent of mass loss ($SD_A$) are used to draw the dissolutions curves shared in FIG. 4A, FIG. 4B and FIG. 4C.

Humidity Test Method

The Humidity Test Method is used to determine the amount of water vapor sorption that occurs in a composition between being dried down at 0% RH and various RH at 25° C. In this method, 10 to 60 mg of sample are weighed, and the mass change associated with being conditioned with differing environmental states is captured in a dynamic vapor sorption instrument. The resulting mass gain is expressed as % change in mass per dried sample mass recorded at 0% RH.

This method makes use of a SPSx Vapor Sorption Analyzer with 1 µg resolution (ProUmid GmbH & Co. KG, Ulm, Germany), or equivalent dynamic vapor sorption (DVS) instrument capable of controlling percent relative humidity (% RH) to within ±3%, temperature to within ±2° C., and measuring mass to a precision of ±0.001 mg.

A 10-60 mg specimen of raw material or composition is dispersed evenly into a tared 1" diameter A1 pan. The A1 pan on which raw material or composition specimen has been dispersed is placed in the DVS instrument with the DVS instrument set to 25° C. and 0% RH at which point masses are recorded ~every 15 minutes to a precision of 0.001 mg or better. After the specimen is in the DVS for a minimum of 12 hours at this environmental setting and constant weight has been achieved, the mass an d of the specimen is recorded to a precision of 0.01 mg or better. Upon completion of this step, the instrument is advanced in 10% RH increments up to 90% RH. The specimen is held in the DVS at each step for a minimum of 12 hours and until constant weight has been achieved, the mass $m_n$ of the specimen is recorded to a precision of 0.001 mg or better at each step.

For a particular specimen, constant weight can be defined as change in mass consecutive weighing that does not differ by more than 0.004%. For a particular specimen, % Change in mass per dried sample mass (% dm) is defined as $$\text{\% Change in mass per dried sample mass} = \frac{m_n - m_d}{m_d} \times 100\%$$

The % Change in mass per dried sample mass is reported in units of % to the nearest 0.01%.

The humidity stability at 80% RH, means that there is less than or equal to a 5% change at 80% RH; no humidity stability at 80% RH, means that there is greater than 5% change at 80%.

Thermal Stability Test Method

All samples and procedures are maintained at room temperature (25±3° C.) prior to testing, and at a relative humidity of 40±10% for 24 hours prior to testing.

In the Thermal Stability Test Method, differential scanning calorimetry (DSC) is performed on a 20 mg±10 mg specimen of sample composition. A simple scan is performed between 25° C. and 90° C., and the temperature at which the largest peak is observed to occur is reported as the Stability Temperature to the nearest ° C.

The sample is loaded into a DSC pan. All measurements are done in a high-volume-stainless-steel pan set (TA part #900825.902). The pan, lid and gasket are weighed and tared on a Mettler Toledo MT5 analytical microbalance (or equivalent; Mettler Toledo, LLC., Columbus, OH). The sample is loaded into the pan with a target weight of 20 mg (+/−10 mg) in accordance with manufacturer's specifications, taking care to ensure that the sample is in contact with the bottom of the pan. The pan is then sealed with a TA High Volume Die Set (TA part #901608.905). The final assembly is measured to obtain the sample weight. The sample is loaded into TA Q Series DSC (TA Instruments, New Castle, DE) in accordance with the manufacture instructions. The DSC procedure uses the following settings: 1) equilibrate at 25° C.; 2) mark end of cycle 1; 3) ramp 1.00° C./min to 90.00° C.; 4) mark end of cycle 3; then 5) end of method; Hit run.

Moisture Test Method

All samples and procedures are maintained at room temperature (25±3° C.) prior to testing, and at a relative humidity of 40±10% for 24 hours prior to testing.

The Moisture Test Method is used to quantify the weight percent of water in a composition. In this method, a Karl Fischer (KF) titration is performed on each of three like specimens of a sample composition. Titration is done using a volumetric KF titration apparatus and using a one-component solvent system. Specimens are 0.3±0.05 g in mass and are allowed to dissolve in the titration vessel for 2.5 minutes prior to titration. The average (arithmetic mean)

moisture content of the three specimen replicates is reported to the nearest 0.1 wt. % of the sample composition.

To measure the moisture content of the sample, measurements are made using a Mettler Toledo V30S Volumetric KF Titrator. The instrument uses Honeywell Fluka Hydranal Solvent (cat. #34800-1L-US) to dissolve the sample, Honeywell Fluka Hydranal Titrant-5 (cat. #34801-1L-US) to titrate the sample and is equipped with three drying tubes (Titrant Bottle, Solvent Bottle, and Waste Bottle) packed with Honeywell Fluka Hydranal Molecular sieve 3 nm (cat. #34241-250g) to preserve the efficacy of the anhydrous materials.

The method used to measure the sample is Type "KF vol", ID "U8000", and Title "KFVol 2-comp 5", and has eight lines which are each method functions.

The Line 1, Title has the following things selected: the Type is set to Karl Fischer titration Vol.; Compatible with is set to be V10S/V20S/V30S/T5/T7/T9; ID is set as U8000; Title is set as KFVol 2-comp 5; Author is set as Administrator; the Date/Time along with the Modified on and Modified by were defined by when the method was created; Protect is set to no; and SOP is set to None.

The Line 2, Sample has two options, Sample and Concentration. When the Sample option is chosen, the following fields are defined as: Number of IDs is set as 1; ID 1 is set as —; Entry type is selected to be Weight; Lower limit is set as 0.0 g; the Upper limit is set as 5.0 g; Density is set as 1.0 g/mL; Correction factor is set as 1.0; Temperature is set to 25.0° C.; Autostart is selected; and Entry is set to After addition. When the Concentration option is chosen, the following fields are defined as: Titrant is selected as KF 2-comp 5; Nominal conc. is set as 5 mg/mL; Standard is selected to be Water-Standard 10.0; Entry type is selected to be Weight; Lower limit is set as 0.0 g; Upper limit is set as 2.0 g; Temperature is set as 25.0° C.; Mix time is set as 10 s; Autostart is selected; Entry is selected to be After addition; Conc. lower limit is set to be 4.5 mg/mL; and Conc. upper limit is set to be 5.6 mg/mL.

The Line 3, Titration stand (KF stand) has the following fields defined as: Type is set to KF stand; Titration stand is selected to be KF stand; Source for drift is selected to be Online; Max. start drift is set to be 25.0 μg/min.

The Line 4, Mix time has the following fields defined as: Duration is set to be 150 s.

The Line 5, Titration (KF Vol) [1] has six options, Titrant, Sensor, Stir, Predispense, Control, and Termination. When the Titrant option is chosen, the following fields are defined as: Titrant is selected to be KF 2-comp 5; Nominal conc. is set to be 5 mg/mL; and Reagent type is set as 2-comp. When the Sensor option is chosen, the following fields are defined as: Type is set to Polarized; Sensor is selected as DM143-SC; Unit is set as mV; Indication is set as Voltametric; and Ipol is set as 24.0 μA. When the Stir option is chosen, the following fields are defined as: Speed is set as 50%. When the Predispense option is chosen, the following fields are defined as: Mode is selected to be None; Wait time is set to be 0 s. When the Control option is chosen, the following fields are defined as: End Point is set to 100.00 mV; Control band is set to be 400.00 mV; Dosing rate (max) is set to be 3 mL/min; Dosing rate (min) is set to be 100 μL/min; and Start is selected to be Normal. When the Termination option is chosen, the following fields are defined as: Type is selected as Drift stop relative; Drift is set to 15.0 μg/min; At Vmax 15 mL; Min. time is set as 0 s; and Max. time is set as co s.

The Line 6, Calculation has the following fields defined as: Result type is selected to be Predefined; Result is set as Content; Result unit is set as %; Formula is set as R1=(VEQ*CONC-TIME*D . . . ); Constant C=is set as 0.1; Decimal places is set as 2; Result limits is not selected; Record statistics is selected; Extra statistical functions is not selected.

The Line 7, Record has the following fields defined as: Summary is selected to be Per sample; Results is selected to be No; Raw results is selected to be No; Table of meas. values is selected to be No; Sample data is selected to be No; Resource data is selected to be No; E-V is selected to be No; E-t is selected to be No; V-t is selected to be No; H2O-t is selected to be No; Drift-t is selected to be No; H2O-t & Drift-t is selected to be no; V-t & Drift-t is selected to be No; Method is selected to be No; and Series data is selected to be No.

The Line 8, End of Sample has the following fields defined as: Open series is selected.

Once the method is selected, press Start, the following fields are defined as: Type is set as Method; Method ID is set as U8000; Number of samples is set as 1; ID 1 is set as —; and Sample size is set as 0 g. The Start option is the pressed again. The instrument will measure the Max Drift, and once it reaches a steady state will allow the user to select Add sample, at which point the user will add the Three-hole adapter and stoppers are removed, the sample is loaded into the Titration beaker, the Three-hole adapter and stoppers are replaced, and the mass, g, of the sample is entered into the Touchscreen. The reported value will be the weight percent of water in the sample. This measure is repeated in triplicate for each sample, and the average of the three measures is reported.

Fibers Test Method

Figure 11A:
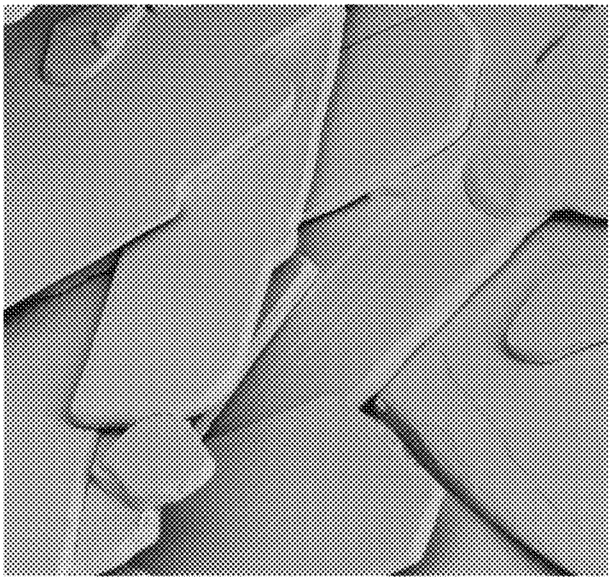
FIG. 11A shows a representative Scanning Electron Micrograph (SEM) of a comparative composition prepared from potassium palmitate (KC16), showing platelet crystals.
Figure 11B:
FIG. 11B shows a representative Scanning Electron Micrograph (SEM) of a comparative composition prepared from triethanolamine palmitate (TEA C16), showing platelet crystals.

The Fiber Test Method is used to determine whether a solid dissolved composition crystallizes under process conditions and contains fiber crystals. A simple definition of a fiber is "a thread or a structure or an object resembling a thread". Fibers have a long length in just one direction (FIG. 1A and FIG. 1B). This differs from other crystal morphologies such as plates or platelets—with a long length in two or more directions (FIG. 11A and FIG. 11B). Only solid dissolvable compositions in which the DCS as fibers are in scope of this invention. One skilled in the art recognizes the SDC domains from the PEGC domains in the solid dissolvable compositions, when present in the same particle.

A sample measuring about 4 mm in diameter is mounted on an SEM specimen shuttle and stub (Quorum Technologies, AL200077B and E7406) with a slit precoated comprising a 1:1 mixture of Scigen Tissue Plus optimal cutting temperature (OCT) compound (Scigen 4586) compound and colloidal graphite (agar scientific G303E). The mounted sample is plunge-frozen in a liquid nitrogen-slush bath. Next, the frozen sample is inserted to a Quorum PP3010Tcryo-prep chamber (Quorum Technologies PP3010T), or equivalent and allowed to equilibrate to −120° C. prior to freeze-fracturing. Freeze fracturing is performed by using a cold built-in knife in the cryo-prep chamber to break off the top of the vitreous sample. Additional sublimation is performed at −90° C. for 5 mins to eliminate residual ice on the surface of the sample. The sample is cooled further to −150° C. and sputter-coated with a layer of Pt residing in the cryo-prep chamber for 60 s to mitigate charging.

High resolution imaging is performed in a Hitachi Ethos NX5000 FIB-SEM (Hitachi NX5000), or equivalent.

To determine the fiber morphology of a sample, imaging is done at 20,000× magnification. At this magnification, individual crystals of the crystallizing agent may be observed. The magnification may be slightly adjusted to lower or higher values until individual crystals are observed. One skilled in the art can assess the longest dimension of the representative crystals in the image. If this longest dimension is about 10× or greater than the other orthogonal dimensions of the crystals, these crystals are considered fibers and in scope for the invention.

EXAMPLES

These examples provide non-limiting examples of low-water compositions comprising solid dissolvable composition (SDC) domains having a mesh microstructure formed from dry sodium fatty acid carboxylate formulations, polyethylene glycol (PEGC) domains, and active agents, such as freshness benefit agent(s) that deliver extraordinary freshness to fabrics dispersed into these domains.

The inventive compositions show particle comprising SDC domains comprising crystallizing agent that—when processed correctly, form fibrous mesh that completely dissolve within a wash cycle. The inventive compositions also show PEGC domains that—when used in combination with the SDC domains, create unique low-water composition that are easy to process, provide unique aesthetic properties and enhanced freshness performance.

The freshness benefit agent(s) takes the form of perfume capsules and/or neat perfumes being distributed into the different domains. EXAMPLE 1 demonstrates particles composed of two or more domains in which the SDC domains are small and completely enclosed in a single PEGC domain (FIG. 7). EXAMPLE 2 demonstrates particles composed of two or more domains in which a single SDC domain is coated and completely enclosed in a coating of PEGC domain (FIG. 8). EXAMPLE 3 demonstrates particles composed of two or more domains in which the particles have a core of a PEGC domain and sprinkled with SDC domains (FIG. 9). EXAMPLE 4 demonstrates particles composed of two or more domains in which the particle has one side containing PEGC domain and one side containing SDC domain (FIG. 10). EXAMPLE 5 suggests low-moisture compositions composed of a physical mixture of two or more different types of particles and freshness benefit agents, where some of the particles are structured as described in Examples 1-4. EXAMPLE 6 suggests compositions prepared from particular blends of fatty acid materials which are neutralized and blended with PEGC to create solid dissolvable compositions, and with perfume capsules with different wall architectures.

The data in TABLE 1-TABLE 8 provide the parameters about the particles in the following way:

Preparation SDC domains—all the weights listed in this part of table, correspond to the amounts added to create the Solid Dissolvable Composition Mixture (SDCM). The "% Freshness Agent (dry)" is the weight percent of the freshness agent remaining in the SDC after drying assuming there is no remaining water, as determined by the MOISTURE TEST METHOD. The "% Slow CA" is the weight percent of the NaC12 (slow dissolving) in mixtures of NaC12 with NaC10 and NaC8 (fast dissolving).

All SDC domains are prepared in three making steps, to ensure the formation of fiber mesh in the domain:

1. Mixing—in which crystallizing agents are completely solubilized in water to form SDCM, and optional addition of active agents;
2. Forming—in which the composition from the mixing step is shaped by size and dimensions of the desired SDC through techniques including crystallization;
3. Drying—in which amount of water is reduced to ensure the desired performance including dissolution, hydration, and thermal stability, and optional addition of active agents.

Preparation PEGC domains, all the weights listed in this part of table, correspond to the amounts of PEG and freshness agents added to create the PEGC. Any water added to the domain by the inclusion of perfume capsule slurry, is not removed and remains part of the domain when combined to form the low-water composition.

Low-water composition, all the weights listed in this part of table, correspond to the amounts of SDC and PEGC, combined to create the low-water composition particle. For clarity, the percentages of the components of the low-water composition are provided as "% CA"=crystallizing agents from the SDC in the final low-water composition, "% Perfume Capsules"=perfume capsules in the final low-water composition, "% Perfume"=neat perfume in the low-water composition, "% PEG"=PEG in the low-water composition, "% Water"=water in the low-water composition, including water not removed from the PEGC. Finally, "Ave. Mass"=the average mass of the particles created as described in each of the examples, of the low-water composition.

The data in TABLE 9-TABLE 10 provide prophetic particles composed SDC and PEGC domains only, the former with different blends of crystallizing agents and freshness benefit agents, and the latter with different molecular weight PEG and freshness benefit agents.

The data in TABLE 11-TABLE 12 provide prophetic low-water compositions, comprising of physical mixtures of particles with SDC domains, PEGC domains, and freshness benefit agents. The amount of 'Perfume capsules in wash' is a dose of perfume capsules in a wash to deliver a desired dry fabric feel benefit to a consumer. The amount of 'Neat capsules in wash' is a dose of neat perfume in a wash to deliver a desired wet fabric feel benefit to a consumer. The @ symbol displayed with the particles identifies the mass of the particles in the low-water composition. The 'Dosage of the composition' is the sum of all the particles in the low-water composition, and the amount the consumer adds to the wash.

The data in TABLE 13 provide prophetic low-water compositions, comprising SDC domains prepared from mixtures of C8, C10 and C12 chain length fatty acids that are neutralized to create SDC domains, which are then combined with PEGC domains, and with perfume capsules with different wall architectures.

Materials (1) Water: Millipore, Burlington, MA (18 m-ohm resistance)

(2) Sodium caprylic (sodium octanoate, NaC8): TCI Chemicals, Cat #00034

(3) Sodium caprate (sodium decanoate, NaC10): TCI Chemicals, Cat #D0024

(4) Sodium laurate (sodium dodecanoate, NaC12): TCI Chemicals, Cat #L0016

(5) Perfume capsule slurry: Encapsys, Encapsulated Perfume #1, melamine formealdehyde wall chemistry, (31% activity)

(6) Perfume capsule slurry: Encapsys, Encapsulated Perfume #2, polyacrylate wall chemistry, (21% activity)

(7) PEG—6,000 g $mol^{-1}$, Alfa Aesar, Product Code A17541.30.

(8) PEG—8,000 g $mol^{-1}$, Alpha Aesar, Product Code 43443.

(9) PEG—9,000 g $mol^{-1}$, Dow Chemical, Product Code C4633240.
(10) PEG—10,000 g $mol^{-1}$, Alfa Aesar, Product Code B21955.30.
(11) Neat perfume: International Flavors and Fragrances, Neat Perfume Oil #1
(12) Fatty Acid Blend: C810L, Procter & Gamble Chemicals, Sample Code: SR26399
(13) Lauric Acid: Peter Cremer, Cat. #FA-1299 Lauric Acid
(14) Sodium Hydroxide (50 wt. % solution): Fisher Scientific, Cat. #SS254-4
(15) Perfume Capsule Slurry: Encapsys, Encapsulated Perfume #3 Polyacrylate wall chemistry, 21 wt. % active
(16) Perfume Capsule Slurry: Encapsys, Encapsulated Perfume #4, High Core to Wall ratio, Polyacrylate wall chemistrEncapsulated Perfume #5, Polyurea wall chemistrywall chemistry, 32 wt. % active
(17) Perfume Capsule Slurry: Encapsulated Perfume #6, silica based wall chemistry, 6.2 wt. % active

Example 1

EXAMPLE 1 demonstrates particles composed of two or more domains in which the SDC domains are completely enclosed in a single PEGC domain (FIG. 7).

This example demonstrates compositions that make it possible to adjust the amount and distribution of different freshness benefit agents using different domains in a single particle. In this non-limiting example, SDC domains are dispersed in a continuous domain of PEGC. This offers several advantages. First, SDC domains offer the opportunity to enhance the amount of perfume capsules (e.g., about 18 wt. %) in a particle relative to a single PEGC domain (e.g., about 1.2 wt. %). Second, these particles maintain a 'smooth' exterior appearance from the PEGC, to enhance the aesthetics of the particle. Third, such compositions offer advantages to manufacturing, where the flow properties of the 'melted' compositions are similar to the flow properties of an all-PEG compositions, providing the potential for these composite compositions to be prepared on existing, commercial equipment. Sample AA—Sample AI are non-limiting examples of compositions and weight ratio of the different domains possible in resulting particles, which can be used as low-water composition.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. No. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes.

Forming—the preparation was poured onto an aluminum foil to an even thickness of about 1 mm. The preparation was then placed in a refrigerator (VWR Door Solid Lock F Refrigerator 115V, 76300-508, or equivalent) equilibrated to 4° C. for 8 hours to crystallize the crystallizing agent.

Drying—they were placed in a convection oven (Yamato, DKN400, or equivalent) set at 25° C. for another 8 hours to pass a steady stream of air to dry the composition. The final SDC was confirmed to be less than 10% moisture by the MOISTURE TEST METHOD. The domains were in shape of the mold, or the flat sheet was broken into coarsely pieces on the order of 1-mm×1-mm in size.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature.

Preparation of Low-Water Compositions

A 60-ml speed mixer cup and cap (Speed Mixer) were weighed. The cap was removed, SDC domains were added to the cup. The cup was resealed with the cap and re-weighed, and the mass of SDC domains in the preparation is the difference in the weight.

A second 60-ml speed mixer cup and cap (Speed Mixer) were weighed. The cap was removed, freshness benefit agent was added to the cup. The cup was resealed with the cap and re-weighed, where the mass of the freshness benefit agent in the preparation is the difference in the weight. The cap was again removed from the cup.

In under 30 seconds, the PEGC was added to the cup, the cap was replaced, and the entire preparation was re-weighed where the mass of PEGC in the preparation is the difference in the weight. The cup was placed in the Speedmixer, it was started, and preparation was mixed at 3,000 RPM for 1 minute. After the mixing, in under 30 seconds (and before crystallization), the preparation was transferred to polymer mold patterned with 5-mm diameter hemispheres. The preparation was allowed to cool at 25° C. for at least 30 minutes. A drawing of the structure of a particle in this low-water composition, is shown in FIG. 7.

TABLE 1

| | Sample AA (inventive) | Sample AB (inventive) |
|---|---|---|
| Preparation SDC | | |
| 1) Water | 30.372 g | 60.92 g |
| 2) NaC8 | — | — |
| 3) NaC10 | 3.750 g | 10.010 g |
| 4) NaC12 | 8.752 g | 15.007 g |
| 5) Perfume capsules (Melamine Formaldehyde) | 7.139 g | 15.30 g |

TABLE 1-continued

| | Sample AA (inventive) | Sample AB (inventive) |
|---|---|---|
| 6) Perfume capsules (polyacrylate) | — | — |
| 11) Perfume | — | — |
| % Freshness Agent (dry) | 15.0% | 15.9% |
| % Slow CA | 70.0% | 60.0% |
| Preparation PEGC | | |
| 7) PEG 6,000 | — | — |
| 8) PEG 8,000 | 20.791 g | — |
| 9) PEG 9,000 | — | 19.497 g |
| 10) PEG 10,000 | — | — |
| 5) Perfume capsules (Melamine Formealdehyde) | — | — |
| 6) Perfume capsules (polyacrylate) | — | — |
| 11) Perfume | — | 4.232 g |
| % Freshness Agent | — | 17.8% |
| Low-water composition | | |
| SDC domain | 4.902 g | 2.848 g |
| PEGC domain | 20.791 g | 18.547 g |
| % CA | 16.2% | 11.2% |
| % Perfume Capsules | 2.8% | 2.1% |
| % Perfume | — | 15.5% |
| % PEG | 81.0% | 71.2% |
| % Water | — | — |
| Ave. Mass | 43.3 mg | 50.5 mg |

TABLE 2

| | Sample AC (inventive) | Sample AD (inventive) | Sample AE (inventive) | Sample AF (inventive) |
|---|---|---|---|---|
| Preparation SDC | | | | |
| 1) Water | 60.92 g | 60.92 g | 27.011 g | 34.726 g |
| 2) NaC8 | — | — | — | — |
| 3) NaC10 | 10.01 g | 10.01 g | 3.757 g | 10.000 g |
| 4) NaC12 | 15.007 g | 15.007 g | 8.750 g | — |
| 5) Perfume capsules (melamine formaldehyde) | 15.30 g | 15.30 g | — | 5.296 g |
| 6) Perfume capsules (polyacrylate) | — | — | 10.497 g | — |
| 11) Perfume | — | — | — | — |
| % Freshness Agent (dry) | 16.0% | 16.0% | 15.0% | 14.1% |
| % Slow CA | 60.0% | 60.0% | 70.0% | — |
| Preparation PEGC | | | | |
| 7) PEG 6,000 | — | — | — | — |
| 8) PEG 8,000 | 16.483 g | 35.842 g | 27.252 g | — |
| 9) PEG 9,000 | — | — | — | 13.568 g |
| 10) PEG 10,000 | — | — | — | — |
| 5) Perfume capsules (melamine formaldehyde) | — | — | — | — |
| 6) Perfume capsules (polyacrylate) | — | — | — | — |

TABLE 2-continued

| | Sample AC (inventive) | Sample AD (inventive) | Sample AE (inventive) | Sample AF (inventive) |
|---|---|---|---|---|
| 11) Perfume | 1.889 g | 5.737 g | 1.089 g | 4.675 g |
| % Freshness Agent | 10.3% | 13.8% | 3.8% | 25.6% |
| Low-water composition | | | | |
| SDC domain | 5.781 g | 17.091 g | 11.303 g | 15.414 g |
| PEGC domain | 12.794 g | 41.579 g | 28.341 g | 18.243 g |
| % CA | 26.2% | 24.5% | 24.2% | 39.3% |
| % Perfume Capsules | 5.0% | 4.6% | 4.3% | 6.5% |
| % Perfume | 7.1% | 9.8% | 2.8% | 13.9% |
| % PEG | 61.8% | 61.1% | 68.7% | 40.3% |
| % Water | — | — | — | — |
| Ave. Mass | 43.8 mg | 60.8 mg | 56.7 mg | 39.4 mg |

TABLE 3

| | Sample AG (inventive) | Sample AH (inventive) | Sample AI (inventive) |
|---|---|---|---|
| Preparation SDC | | | |
| 1) Water | 35.721 g | 36.116 g | 37.380 g |
| 2) NaC8 | — | — | — |
| 3) NaC10 | 5.006 g | 5.009 g | 5.006 g |
| 4) NaC12 | 7.513 g | 7.500 g | 7.501 g |
| 5) Perfume capsules (melamine formaldehyde) | — | — | — |
| 6) Perfume capsules (POLYACRYLATE) | — | — | — |
| 11) Perfume | 1.809 g | 1.399 g | 0.130 g |
| % Freshness Agent (dry) | 12.6% | 10.1% | 1.0% |
| % Slow CA | 60.0% | 60.0% | 60.0% |
| Preparation PEGC | | | |
| 7) PEG 6,000 | — | 25.382 g | — |
| 8) PEG 8,000 | — | — | — |
| 9) PEG 9,000 | — | — | — |
| 10) PEG 10,000 | 25.017 g | — | 24.853 g |
| 5) Perfume capsules (melamine formaldehyde) | 1.161 g | 1.073 g | — |
| 6) Perfume capsules (POLYACRYLATE) | — | — | 2.072 g |
| 11) Perfume | — | — | — |
| % Freshness Agent | 1.4% | 1.3% | 1.6% |
| Low-water composition | | | |
| SDC domain | 5.246 g | 6.661 g | 1.598 g |
| PEGC domain | 26.178 g | 26.455 g | 26.925 g |
| % CA | 14.6% | 18.1% | 5.54% |
| % Perfume Capsules | 1.2% | 1.0% | 1.5% |
| % Perfume | 2.1% | 2.0% | 0.1% |
| % PEG | 70.6% | 76.7% | 87.1% |
| % Water | 2.6% | 2.2% | 5.7% |
| Ave. Mass | 50.5 mg | 52.5 mg | 58.0 mg |

Example 2

EXAMPLE 2 demonstrates particles composed of two or more domains in which a single SDC domain is coated and completely enclosed in a coating of PEGC domain (FIG. 8).

This example demonstrates compositions have particles with SDC domain core and a PEGC coating. In this non-limiting example, SDC a single domain is enclosed in a continuous domain of PEGC. This has several advantages. These particles offer the opportunity to enhance the amount of perfume capsules in SDC domain (e.g., high as about 18 wt. %) relative to the amount perfume capsules in SDC domain (e.g., only as high as about 1.3 wt. %). The particles have about a ten-fold increase in freshness benefit agent capacity. The SDC domains are also about 50-70% less dense, making the particles (and the resulting low-water composition) more agreeable to different commercial approach such as e-commercial, more sustainable with less carrier required for unit freshness, and more sustainable replacing petroleum-based PEG with natural crystallizing agents. Further, the use of the PEGC coating allows the particle to maintain a 'smooth' or sheen outer appearance of the PEGC domain, valued by many consumers. Sample BA—Sample BI are non-limiting examples of compositions and weight ratio of the different domains possible in resulting particles.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added— as specified in tables, by placing the preparation in the Speedmixer (Flack Tek. Inc, Landrum, SC, model DAC 150.1 FVZ-K) at a rate of 3000 rpm for 3 minutes.

Forming—the preparation was transferred to polymer mold patterned with 5-mm diameter hemispheres. The preparation was then placed in a refrigerator (VWR Door Solid Lock F Refrigerator 115V, 76300-508, or equivalent) equilibrated to 4° C. for 8 hours to crystallize the crystallizing agent.

Drying—they were placed in a convection oven (Yamato, DKN400, or equivalent) set at 25° C. for another 8 hours to pass a steady stream of air to dry the composition. The final SDC was confirmed to be less than 10% moisture by the MOISTURE TEST METHOD.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added— as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature.

Preparation of Low-Water Compositions

Measured the weight of weigh boat. The SDC in was placed in the weigh boat, where the weight of the SDC is determined by the difference in the mass. The SDC is dipped into the PEGC melt. The excess PEGC was wiped from the surface of the SDC. The preparation was placed in the weigh boat. The preparation was allowed to cool at 25° C. for at least 30 minutes. Measured the weight of weigh boat, where the weight of the perfume is determined by the difference in the weight. A drawing of the structure of a particle in this low-water composition, is shown in FIG. 8.

TABLE 4

| | Sample BA (inventive) | Sample BB (inventive) | Sample BC (inventive) | Sample BD (inventive) |
|---|---|---|---|---|
| Preparation SDC | | | | |
| 1) Water | 60.92 g | 60.92 g | 27.011 g | 30.873 g |
| 2) NaC8 | — | — | — | — |
| 3) NaC10 | 10.01 g | 10.01 g | 3.757 g | — |
| 4) NaC12 | 15.007 g | 15.007 g | 8.750 g | 12.500 g |
| 5) Perfume capsules (melamine formaldehyde) | 15.30 g | 15.30 g | — | — |
| 6) Perfume capsules (POLYACRYLATE) | — | — | 10.497 g | 6.676 g |
| 11) Perfume | — | — | — | — |
| % Freshness Agent (dry) | 16.0% | 16.0% | 15.0% | 10.1% |
| % Slow CA | 60.0% | 60.0% | 70.0% | — |
| Preparation PEGC | | | | |
| 7) PEG 6,000 | — | — | — | — |
| 8) PEG 8,000 | 25.000 g | 25.000 g | 25.000 g | — |
| 9) PEG 9,000 | — | — | — | 8.640 g |
| 10) PEG 10,000 | — | — | — | — |
| 5) Perfume capsules (melamine formaldehyde) | — | — | — | — |
| 6) Perfume capsules (POLYACRYLATE) | — | — | — | — |
| 11) Perfume | — | — | — | 3.448 g |
| % Freshness Agent | — | — | — | 28.5% |
| Low-water composition | | | | |
| SDC domain | 0.0082 g | 0.0099 g | 0.2883 g | 0.0119 g |
| PEGC domain | 0.0074 g | 0.0046 g | 0.1476 g | 0.0109 g |
| % CA | 44.7% | 57.4% | 56.2% | 47.0% |
| % Perfume Capsules | 8.4% | 10.9% | 9.9% | 5.3% |
| % Perfume | — | — | — | 13.6% |
| % PEG | 47.4% | 31.7% | 33.9% | 34.2% |
| % Water | | | | |
| Ave. Mass | 15.6 mg | 14.5 mg | 435.9 mg | 22.8 mg |

TABLE 5

| | Sample BE (inventive) | Sample BF (inventive) | Sample BG (inventive) |
|---|---|---|---|
| Preparation SDC | | | |
| 1) Water | 34.726 g | 28.331 g | 30.372 g |
| 2) NaC8 | — | — | — |
| 3) NaC10 | 10.000 g | 7.554 g | 3.750 g |
| 4) NaC12 | — | 7.511 g | 8.752 g |
| 5) Perfume capsules (melamine formaldehyde) | — | | 7.139 g |

TABLE 5-continued

| | Sample BE (inventive) | Sample BF (inventive) | Sample BG (inventive) |
|---|---|---|---|
| 6) Perfume capsules (polyacrylate) | 5.296 g | 6.671 g | — |
| 11) Perfume | — | — | — |
| % Freshness Agent (dry) | 10.0% | 8.5% | 15.0% |
| % Slow CA | — | 50.0% | 70.0% |
| Preparation PEGC | | | |
| 7) PEG 6,000 | — | — | — |
| 8) PEG 8,000 | — | 25.000 g | 25.000 g |
| 9) PEG 9,000 | 8.640 g | — | — |
| 10) PEG 10,000 | — | — | — |
| 5) Perfume capsules (melamine formaldehyde) | — | — | — |
| 6) Perfume capsules (POLYACRYLATE) | — | — | — |
| 11) Perfume | 3.448 g | — | — |
| % Freshness Agent | 28.5% | — | — |
| Low-water composition | | | |
| SDC domain | 0.0101 g | 0.0157 g | 0.0092 g |
| PEGC domain | 0.0159 g | 0.1300 g | 0.1294 g |
| % CA | 35.0% | 9.8% | 5.6% |
| % Perfume Capsules | 3.9% | 0.9% | 1.0% |
| % Perfume | 17.4% | — | — |
| % PEG | 43.7% | 89.2% | 93.4% |
| % Water | — | — | — |
| Ave. Mass | 26.0 mg | 145.7 mg | 138.6 mg |

TABLE 6

| | Sample BH (inventive) | Sample BI (inventive) |
|---|---|---|
| Preparation SDC | | |
| 1) Water | 37.380 g | 35.721 g |
| 2) NaC8 | — | — |
| 3) NaC10 | 5.0066 g | 5.0060 g |
| 4) NaC12 | 7.5010 g | 7.5136 g |
| 5) Perfume capsules (melamine formaldehyde) | — | — |
| 6) Perfume capsules (POLYACRYLATE) | — | — |
| 11) Perfume | 0.130 g | 1.8096 g |
| % Freshness Agent (dry) | 1.0% | 12.6% |
| % Slow CA | 60.0% | 60.0% |
| Preparation PEGC | | |
| 7) PEG 6,000 | — | — |
| 8) PEG 8,000 | 13.090 g | 13.090 g |
| 9) PEG 9,000 | — | — |
| 10) PEG 10,000 | — | — |
| 5) Perfume capsules (melamine formaldehyde) | — | — |
| 6) Perfume capsules (POLYACRYLATE) | 0.668 g | 0.668 g |

TABLE 6-continued

| | Sample BH (inventive) | Sample BI (inventive) |
|---|---|---|
| 11) Perfume | — | — |
| % Freshness Agent | 1.5% | |
| Low-water composition | | |
| SDC | 0.0119 g | 0.0119 g |
| PEGC | 0.0737 g | 0.0427 g |
| % CA | 13.8% | 19.0% |
| % Perfume Capsules | 1.3% | 0.5% |
| % Perfume | 0.1% | 2.8% |
| % PEG | 79.9% | 75.6% |
| % Water | 4.9% | 1.9% |
| Ave. Mass | 85.6 mg | 54.6 mg |

Example 3

EXAMPLE 3 demonstrates particles composed of two or more domains in which the particles have a core of a PEGC domain and sprinkled with SDC domains (FIG. 9)

Such particles offer the opportunity—for example, for particles with significant amounts of PEGC and SDC domains, with the dissolution properties of each domain independently. In the non-limiting Sample CA and Sample CB, the perfume capsules are put in the SDC domain and released into the wash cycle at a rate consistent with the composition of the blend of the crystallizing agents, and the neat perfumes are put into the PEGC domains and released into the wash cycle at a rate consistent with the molecular weight of the PEG. The solubility percent as determined by the DISSOLUTION TEST METHOD is now independent of the different domains in contrast to the particles described, for example, in Example 1. Also, such a form becomes aesthetically advantageous to consumer with the affixed domains signal different functionality in the particles. Further, such forms are easy to commercially prepare by—for example, passing a warm PEGC domain through a 'sprinkling' of SDC domain particles, which can stick to the surface of the domain.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes.

Forming—the preparation was poured onto an aluminum foil to an even thickness of about 1 mm. The preparation was then placed in a refrigerator (VWR Door Solid Lock F Refrigerator 115V, 76300-508, or equivalent) equilibrated to 4° C. for 8 hours to crystallize the crystallizing agent.

Drying—hey were placed in a convection oven (Yamato, DKN400, or equivalent) set at 25° C. for another 8 hours to pass a steady stream of air to dry the composition. The final SDC was confirmed to be less than 10% moisture by the MOISTURE TEST METHOD. The flat sheet was broken into coarsely pieces on the order of 1-mm×1-mm in size.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature.

Preparation of Low-Water Compositions

A small amount of the of the PEGC was placed in a weigh boat and weighed. Before significant crystallization (within 30 seconds), a small amount of SDC was gently sprinkled on the PEGC. The small-size SDC domain stuck to the surface of the PEGC domain as the material crystallized. The preparation was allowed to cool at 25° C. for at least 30 minutes. The resulting particle is removed from the mold and reweighed to determine the associate amount of SDC. A drawing of the structure of a particle in this low-water composition, is shown in FIG. 9.

TABLE 7

| | Sample CA (inventive) | Sample CB (inventive) |
|---|---|---|
| Preparation SDC | | |
| 1) Water | 59.878 g | 59.878 g |
| 2) NaC8 | — | — |
| 3) NaC10 | 10.004 g | 10.004 g |
| 4) NaC12 | 15.006 g | 15.006 g |
| 5) Perfume capsules (MELAMINE FORMALDEHYDE) | 15.131 g | 15.131 g |
| 6) Perfume capsules (POLYACRYLATE) | — | — |
| 11) Perfume | — | — |
| % Freshness Agent (dry) | 15.8% | 15.8% |
| % Slow CA | 60.0% | 60.0% |
| Preparation PEGC | | |
| 7) PEG 6,000 | 40.009 g | — |
| 8) PEG 8,000 | — | — |
| 9) PEG 9,000 | — | — |
| 10) PEG 10,000 | — | 40.005 g |
| 5) Perfume capsules (melamine formaldehyde) | — | — |
| 6) Perfume capsules (POLYACRYLATE) | — | — |
| 11) Perfume | 10.008 g | 10.007 g |
| % Freshness Agent | 20.0% | 20.0% |
| Low-water composition | | |
| SDC domain | 0.0136 g | 0.0453 g |
| PEGC domain | 0.0874 g | 0.1816 g |
| % CA | 11.3% | 16.8% |
| % Perfume Capsules | 2.1% | 3.1% |
| % Perfume | 17.3% | 16.0% |
| % PEG | 69.2% | 64.0% |
| % Water | — | — |
| Ave. Mass | 10.1 mg | 22.7 mg |

Example 4

EXAMPLE 4 demonstrates particles composed of two or more domains in which the particle has one side containing PEGC domain and one side containing SDC domain (FIG. 10).

Such particles also offer the opportunity—for example, for particles with significant amounts of PEGC and SDC domains, with the dissolution properties of each domain independently. In the non-limiting example of Sample DA and Sample DB, the perfume capsules are put in the SDC domain and released into the wash cycle at a rate consistent with the composition of the blend of the crystallizing agents, and the neat perfumes are put into the PEGC domains and released into the wash cycle at a rate consistent with the molecular weight of the PEG. The solubility percent as determined by the DISSOLUTION TEST METHOD is now independent of the different domains in contrast to the particles described, for example, in Example 1. Further, such a form places no limits on the absolute amount of SDC and PEGC domains, in the particle relative to EXAMPLE 3.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. No. NO97042-690). Water (Milli-Q Academic) and crystallizing agents were added to the beaker. A temperature probe was placed into composition. A mixing device comprising an overhead mixer (IKA Works Inc, Wilmington, NC, model RW20 DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear. The preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes.

Forming—the preparation was transferred to polymer mold patterned with 5-mm diameter hemispheres. The preparation was then placed in a refrigerator (VWR Door Solid Lock F Refrigerator 115V, 76300-508, or equivalent) equilibrated to 4° C. for 8 hours to crystallize the crystallizing agent.

Drying—they were placed in a convection oven (Yamato, DKN400, or equivalent) set at 25° C. for another 8 hours to pass a steady stream of air to dry the composition. The preparation was removed from the molds when completely dry. The final SDC was confirmed to be less than 10% moisture by the MOISTURE TEST METHOD.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added— as specified in tables, by placing the preparation in the Speedmixer (Flack Tek. Inc, Landrum, SC, model DAC 150.1 FVZ-K) at a rate of 3000 rpm for 3 minutes. The preparation was used to make the low-water composition within 5 minutes of reaching the final temperature. The preparation was transferred to polymer mold patterned with 5-mm diameter hemispheres.

Preparation of Low-Water Compositions

Within 30 seconds of placement of the preparation in the mold, a domain of SDC was placed on the liquid PEGC, such that the flat side of the SDC was placed on the flat side of the PEGC. The preparation was allowed to cool at 25° C. for at least 30 minutes. The low-water composition was removed from the mold after complete cooling. The two domains were affixed, and the resulting particle was spherical in shape as illustrated in FIG. 10.

TABLE 8

| | Sample DA (inventive) | Sample DB (inventive) |
|---|---|---|
| Preparation SDC | | |
| 1) Water | 59.878 g | 59.787 g |
| 2) NaC8 | — | — |
| 3) NaC10 | 10.004 g | 10.004 g |
| 4) NaC12 | 15.006 g | 15.006 g |
| 5) Perfume capsules (MELAMINE FORMALDEHYDE) | 15.131 g | 15.131 g |
| 6) Perfume capsules (POLYACRYLATE) | — | — |
| 11) Perfume | — | — |
| % Freshness Agent (dry) | 15.8% | 15.8% |
| % Slow CA | 60.0% | 60.0% |
| Preparation PEGC | | |
| 7) PEG 6,000 | 40.009 g | — |
| 8) PEG 8,000 | — | — |
| 9) PEG 9,000 | — | — |
| 10) PEG 10,000 | — | 40.005 g |
| 5) Perfume capsules (MELAMINE FORMALDEHYDE) | — | — |
| 6) Perfume capsules (POLYACRYLATE) | — | — |

TABLE 8-continued

| | Sample DA (inventive) | Sample DB (inventive) |
|---|---|---|
| 11) Perfume | 10.008 g | 10.007 g |
| % Freshness Agent | 20.0% | 20.0% |
| Low-water composition | | |
| SDC domain | 0.0077 g | 0.0080 g |
| PEGC domain | 0.0280 g | 0.0457 g |
| % CA | 18.2% | 12.5% |
| % Perfume Capsules | 3.4% | 2.4% |
| % Perfume | 15.7% | 17.0% |
| % PEG | 62.7% | 68.0% |
| % Water | — | — |
| Ave. Mass | 35.7 mg | 53.7 mg |

Example 5

EXAMPLE 5 demonstrates low-water composition composed of two or more different particles, where the particles may contain combinations of SDC and PEGC domains as described in previous example or may contain only single SDC and PEGC domains with freshness benefit agents. These non-limiting examples, describe the later; however, it is understood such physical blends of particles to create a low-water composition may also include the former.

Particle composition Sample EA—Sample EH (TABLE 9 and TABLE 10) represent viable particle compositions, containing a single SDC or PEGC domain. Sample EI—Sample EQ (TABLE 11 and TABLE 12) represent inventive low-water compositions composed of the particle compositions. The type and quantity of the particles in the low-water composition is expressed as "Dosage of the composition", or typical quantity of used in a single wash by a consumer. Numerous considerations are important in deciding dosage including the amount of "Perfume capsules in wash" and the amount of "Neat Perfume in wash" added by the dosage; however, other factors such as the selection of the composition of the SDC or PEGC domains also important to delivering the level of freshness benefit. For example, a consumer might prefer either exceptionally long-lasting freshness on dry fabrics which may would require dose of about 5-10 grams of perfume capsules in the wash or alternatively a consumer might prefer just an initial burst of freshness on rubbing which may would require dose of about 0.5-2 grams of perfume capsules in the wash. For example, a consumer might prefer exceptionally 'flash' of freshness on removing wet fabrics from the wash which may require about 5-10 grams of neat perfume or a consumer might prefer subtle, pleasant linger of freshness on removing wet fabrics from the wash which may require only about 1-2 grams of neat perfume in the wash. These freshness profiles are further influenced by the dissolution rates of the domains, containing the freshness benefit agents. Finally, the selection of the particles the comprise the low-water composition is also influenced by commercial considerations. It is often more commercially-viable to create two types of particles and physically mix at different ratios to enable compositions reach all the consumer preferences, rather than a special process for each consumer. This is often termed 'late product differentiation'. Some consumers may prefer a dose that contains a large, capful of the composition on the order of about 50-100 grams while some e-consumers or sustainability-minded consumers may prefer a more-concentrated and compact dose of about 10-20 grams. Net, these examples provide a range of freshness performance and commercial opportunities.

TABLE 9

| | Sample EA (particle) | Sample EB (particle) | Sample EC (particle) | Sample ED (particle) |
|---|---|---|---|---|
| SDC Domains | | | | |
| 2) NaC8 | — | — | 20 g | — |
| 3) NaC10 | 30.0 g | 40 g | — | 40 g |
| 4) NaC12 | 70.0 g | 60 g | 80 g | 60 g |
| Perfume capsules (MELAMINE FORMALDEHYDE)* | 18.0 g | — | 15 g | — |
| Perfume capsules (POLYACRYLATE)* | — | 18.0 g | — | — |
| % Perfume capsules (dry) | 15.3% | 15.3% | 12.0% | — |
| 11) Perfume | — | — | 10.0 g | 10.0 g |
| % Perfume (dry) | — | — | 8.0% | 9.1% |
| % Slow CA | 70.0% | 60.0% | — | 60.0% |
| PEGC Domains | | | | |
| 7) PEG 6,000 | — | — | — | — |
| 8) PEG 8,000 | — | — | — | — |
| 9) PEG 9,000 | — | — | — | — |
| 10) PEG 10,000 | — | — | — | — |
| Perfume capsules (MELAMINE FORMALDEHYDE)* | — | — | — | — |
| Perfume capsules (POLYACRYLATE)* | — | — | — | — |
| % Perfume capsules (dry) | — | — | — | — |
| 11) Perfume | — | — | — | — |
| % Perfume (dry) | — | — | — | — |

*Prepared from perfume capsule slurries material 5 and 6.

TABLE 10

| | Sample EE (particle) | Sample EF (particle) | Sample EG (particle) | Sample EH (particle) |
|---|---|---|---|---|
| SDC Domains | | | | |
| 2) NaC8 | — | — | — | — |
| 3) NaC10 | — | — | — | — |
| 4) NaC12 | — | — | — | — |
| Perfume capsules (MELAMINE FORMALDEHYDE)* | — | — | — | — |
| Perfume capsules (POLYACRYLATE)* | — | — | — | — |
| % Perfume capsules (dry) | — | — | — | — |
| 11) Perfume | — | — | — | — |
| % Perfume (dry) | — | — | — | — |
| % Slow CA | — | — | — | — |
| PEGC Domains | | | | |
| 7) PEG 6,000 | — | — | 100 g | — |
| 8) PEG 8,000 | 100 g | — | — | — |
| 9) PEG 9,000 | — | — | — | 100 g |
| 10) PEG 10,000 | — | 100 g | — | — |
| Perfume capsules (MELAMINE FORMALDEHYDE)* | 1.2 g | | — | 1.2 g |
| Perfume capsules (POLYACRYLATE) | — | 1.2 g | — | — |
| % Perfume capsules (dry) | 1.2% | 1.2% | — | 1.1% |
| 11) Perfume | — | — | 20 g | 7.0 g |
| % Perfume (dry) | — | — | 16.7% | 6.5% |

*Prepared from perfume capsule slurries material 5 and 6.

TABLE 11

| | Sample EI (inventive) | Sample EJ (inventive) | Sample EK (inventive) | Sample EL (inventive) |
|---|---|---|---|---|
| Preparation low-water composition | | | | |
| SDC particles | Sample EA @ 49.0 g | Sample EB @ 49.0 g | Sample ED @ 50 g | Sample EC @ 10 g |
| PEGC particles | Sample EG @ 6.0 g | Sample EG @ 48.0 g | Sample EE @ 75 g | Sample EH @ 10 g |
| Dosage of the composition | 55.0 g | 97.0 g | 125.0 g | 20.0 g |
| Perfume capsules in wash | 7.5 g | 7.5 g | 0.9 g | 1.3 g |
| Neat Perfume in wash | 1.0 g | 8.0 g | 4.6 g | 0.9 g |

TABLE 12

| | Sample EM (inventive) | Sample EN (inventive) | Sample EO (inventive) | Sample EQ (inventive) |
|---|---|---|---|---|
| Preparation low-water composition | | | | |
| SDC particles | Sample EC @ 30.0 g | — | Sample EB @ 15 g | Sample EC @ 50 g |
| PEGC particles | Sample EF @ 30.0 g | Sample EA @ 15.0 g | — | — |
| Composite Particle (Example 1-Example 4) | — | Sample AH @ 20.0 g | Sample BD @ 15 g | Sample CA @ 40 g |
| Dosage of the composition | 60.0 g | 35.0 g | 30.0 g | 90.0 g |
| Perfume capsules in wash | 4.0 g | 3.6 g | 3.1 g | 6.8 g |
| Neat Perfume in wash | 2.4 g | 2.8 g | 4.0 g | 10.9 g |

Example 6

EXAMPLE 6 suggests compositions prepared from particular blends of fatty acid materials which are neutralized into SDC compositions and blended with PEGC compositions to create a solid dissolvable compositions in which the SDC (e.g., FIG. 4A, FIG. 4B and FIG. 4C) and PEGC domains have different dissolution rate profiles allow different sequencing of the actives within each domain at particular times in the wash cycle. The dissolution rate of the SDC is influenced by the percentage of slow crystallizing agent (% slow CA) where those with higher levels (e.g., Sample EU) dissolve slower than those with lower levels (e.g., Sample ER). The absolute dissolution rate at different temperature is determined by the DISSOLUTION TEST METHOD. The dissolution rate of the PEGC is influenced by the molecular weight of the PEG, such that Sample ER (e.g., PEG 10,000) dissolves slower than Sample ES (e.g., PEG 8,000) which dissolves slower than Sample ET and Sample EU (e.g., PEG 6,000). The absolute dissolution rate at different temperature is determined by the DISSOLUTION TEST METHOD.

Preparation of SDC Domains

Mixing—a 250-ml stainless steel beaker (Thermo Fischer Scientific, Waltham, MA.) was placed on a hot plate (VWR, Radnor, PA, 7×7 CER Hotplate, cat. no. NO97042-690). Water (Milli-Q Academic) and crystallizing agents were added to the beaker. A temperature probe was placed into composition. A mixing device comprising an overhead mixer (IKA Works Inc, Wilmington, NC, model RW20

DMZ) and a three-blade impeller design was assembled, with the impeller placed in the preparation. The heater was set at 80° C., the impeller was set to rotate at 250 rpm and the composition was heated to 80° C. or until all the crystallizing agent was solubilized and the composition was clear.

Forming—the preparation was then poured into a Max 100 Mid Cup (Speed Mixer), capped, and allowed to cool to 25° C. Freshness benefit agent was added—as specified in tables, by placing the preparation in the Speedmixer (Flack Tek. Inc, Landrum, SC, model DAC 150.1 FVZ-K) at a rate of 3000 rpm for 3 minutes. In a non-limiting example, the preparation was transferred to polymer mold patterned with 5-mm diameter hemispheres. In another non-limiting example, the preparation was sprayed through an orifice to create small droplets. The size and shape of the DSC domains is formed to meet the final structure of the final low-water composition (e.g., FIG. 7, FIG. 8, FIG. 9, and FIG. 10). The preparation was then placed in a refrigerator (VWR Door Solid Lock F Refrigerator 115V, 76300-508, or equivalent) equilibrated to 4° C. for 8 hours to crystallize the crystallizing agent.

Drying—the preparations were placed in a convection oven (Yamato, DKN400, or equivalent) set at 25° C. for another 8 hours to pass a steady stream of air to dry the composition. The preparation was removed from the molds when completely dry. The final SDC was confirmed to be less than 10% moisture by the MOISTURE TEST METHOD.

Preparation of PEGC Domains

Separately, a 250-ml stainless steel beaker (Thermo Fischer Scientific, Waltham, MA.) was placed on a hot plate (VWR, Radnor, PA, 7×7 CER Hotplate, cat. no. NO97042-690). PEG (Material 8-11) was added to the beaker. A mixing device comprising an overhead mixer (IKA Works Inc, Wilmington, NC, model RW20 DMZ) and a three-blade impeller design was assembled, with the impeller placed in the preparation. A temperature probe was also placed into preparation. The impeller was set to rotate at 250 rpm. The preparation was heated to 100° C. until the PEG melted completely. Freshness benefit agent was added— as specified in tables, by placing the preparation in the Speedmixer (Flack Tek. Inc, Landrum, SC, model DAC 150.1 FVZ-K) at a rate of 3000 rpm for 3 minutes. In a non-limiting example, the preparation was used to make the low-water composition within 5 minutes of reaching the final temperature. In a non-limiting example, the preparation was transferred to polymer mold patterned with 5-mm diameter hemispheres. The size and shape of the DSC domains is formed to meet the final structure of the final low-water composition (e.g., FIG. 7, FIG. 8, FIG. 9, and FIG. 10).

Preparation of Low-Water Compositions

Sample ER (5 mg)—SDC composition is sprayed as small drops onto a flat sheet, crystallized, and dried. The PEGC is sprayed onto a flat sheet and crystallized. The two flat ends are combined to create a low-water composition particle (e.g., FIG. 10). Sample ES (5 mg)—SDC composition is sprayed as small drops onto a flat sheet, crystallized, and dried. The PEGC is sprayed onto the surface of the SDC composition and crystallized. The low-water composition is a coated particle (e.g., FIG. 8). Sample ET (500 mg)—PEGC composition is placed as large drops onto a flat sheet, crystallized, and dried. The SDC is sprayed to create a fine granule, which adheres to the surface of the large drop. The low-water composition is a sugary-gum-drop-like particle (e.g., FIG. 9). Sample EU (500 mg)—SDC composition is spray dried small particles. The small SDC particles are added to the PEGC melt, and a large drop is placed on a flat surface and crystallized. The low-water composition encapsulates the SDC (e.g., FIG. 7).

In a non-limiting case, a final low-water composition for a wash treatment, may contain particles inclusive of one of a combination of multiple particle described in Sample ER, Sample ES, Sample ET, and Sample EU.

TABLE 13

| | Sample ER (inventive) | Sample ES (inventive) | Sample ET (inventive) | Sample EU (inventive) |
|---|---|---|---|---|
| Preparation SDC | | | | |
| 1) Water | 445 g | 447 g | 522 g | 231 g |
| 12) C8C10L | 114 g | 91 g | 91 g | 66 g |
| 13) Lauric Acid | 117 g | 141 g | 141 g | 158 g |
| 14) NaOH | 105 g | 103 g | 103 g | 97 g |
| (15) Perfume capsules | 219 g | — | — | — |
| (16) Perfume capsules | — | 219 g | — | — |
| (17) Perfume capsules | — | — | 144 g | — |
| (18) Perfume capsules | — | — | — | 448 g |
| % Slow CA | 50.0% | 60% | 60% | 70% |
| Preparation PEGC | | | | |
| 7) PEG 6,000 | — | — | 693 g | 90 g |
| 8) PEG 8,000 | — | 393 g | — | — |
| 9) PEG 9,000 | — | — | — | — |
| 10) PEG 10,000 | 103 g | — | — | — |
| 11) Perfume | 40 g | 40 g | 40 g | 20 g |
| Low-water composition | | | | |
| SDC domain | 2.70 mg | 1.39 mg | 92.78 mg | 322.50 mg |
| PEGC domain | 2.30 mg | 3.61 mg | 407.22 mg | 177.50 mg |
| | FIG. 10 | FIG. 8 | FIG. 9 | FIG. 7 |
| % CA | 45.8 | 23.7% | 15.8% | 58.1% |
| % Perfume capsules | 8.1% | 4.2% | 2.8% | 6.5% |
| % Perfume | 12.9% | 6.7% | 4.4% | 6.5% |
| % PEG | 33.2% | 65.5% | 77.0% | 29.0% |
| Ave. Mass | 5.00 mg | 5.00 mg | 500 mg | 500 mg |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A low-water composition, comprising:

1) At least one solid dissolvable composition domain (SDC) having crystallizing agent;

2) at least one polyethylene glycol domain (PEGC);

3) a population of capsules comprising freshness benefit agent; and wherein the crystallizing agent is the sodium salt of saturated fatty acids having from 8 to about 12 carbon atoms;

wherein the capsules are present in at least one of the SDC or PEGC;

wherein the low-water composition has a water content of less than about 10 wt. %; and wherein the sodium salt of saturated fatty acids of the crystallizing agent comprises from 50 wt. % to 70 wt. % C12, 15 wt. % to 25 wt. % C10, and 15 wt. % to 25 wt. % C8; and wherein the capsules comprise:

an oil-based core comprising a freshness benefit agent; and a shell surrounding the core, the shell comprising:

a substantially inorganic first shell component comprising:

a condensed layer comprising a condensation product of a precursor, and a nanoparticle layer comprising inorganic nanoparticles, wherein the condensed layer is disposed between the core and the nanoparticle layer, and an inorganic second shell component surrounding the first shell component, wherein the second shell component surrounds the nanoparticle layer, and wherein the precursor comprises at least one compound of Formula (I)

$$(M^vO_zY_n)_w \quad \text{(Formula I)}$$

where M is one or more of silicon, titanium and aluminum, v is the valence number of M and is 3 or 4, z is from 0.5 to 1.6 each Y is independently selected from —OH, —$OR^2$, halo,

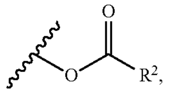

—$NH_2$, —$NHR^2$, —$N(R^2)_2$, and

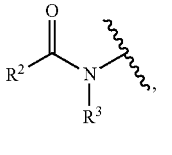

wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0.7 to (v-1), and w is from 2 to 2000.

2. The low-water composition of claim 1, wherein the sodium salt of saturated fatty acids comprises between 50% and 70% percent slow crystallizing agent (% slow CA).

3. The low-water composition of claim 1, wherein the crystallizing agent in the SDC domain is in the form of fiber, as determined by the FIBERS TEST METHOD.

4. The low-water composition of claim 1, wherein the amount of water is less than 10 wt. % of the final low-water composition as determined by the MOISTURE TEST METHOD.

5. The low-water composition of claim 1, where the freshness benefit agent is at least one of a perfume or a malodor counteractant.

6. The low-water composition of claim 5, where the freshness benefit agent is a neat perfume.

7. The low-water composition of claim 6, where the freshness benefit agent is at least one of 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, gamma-damascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, and beta-dihydro ionone, linalool, ethyllinalool, tetrahydrolinalool, dihydromyrcenol, or mixtures thereof.

8. The low-water composition of claim 1, wherein the inorganic nanoparticles of the first shell component, comprise at least one of metal nanoparticles, mineral nanoparticles, metal-oxide nanoparticles or semi-metal oxide nanoparticles.

9. The low-water composition of claim 1, where the inorganic nanoparticles comprise at least one of $SiO_2$, $TiO_2$, $Al_2O_3$, $Fe_2O_3$, $Fe_3O_4$, $CaCO_3$, clay, silver, gold, or copper.

10. The low-water composition of claim 1, where the inorganic nanoparticles comprise $SiO_2$, $CaCO_3$, $Al_2O_3$ and clay.

11. The low-water composition of claim 1, where the inorganic second shell component comprises at least one of $SiO_2$, $TiO_2$, $Al_2O_3$, $CaCO_3$, $Ca_2SiO_4$, $Fe_2O_3$, $Fe_3O_4$, iron, silver, nickel, gold, copper, or clay.

12. The low-water composition of claim 1, where the inorganic second shell component comprises at least one of $SiO_2$ or $CaCO_3$.

13. The low-water composition of claim 1, wherein the capsules have a mean volume weighted capsule diameter of about 0.1 μm to about 200 μm.

14. The low-water composition of claim 1, wherein the shell has a thickness of about 10 nm to about 10,000 nm.

15. The low-water composition of claim 1, wherein the compound of formula (I) has a Polystyrene equivalent Weight Average Molecular Weight (Mw) of from about 700 Da to about 30,000 Da.

16. The low-water composition of claim 15, wherein the compound of formula (I) has a degree of branching of 0.2 to about 0.6.

17. The low-water composition of claim 1, wherein the compound of formula (I) has a molecular weight polydispersity index of about 1 to about 20.

18. The low-water composition of claim 1, wherein the precursor further comprises at least one compound of Formula (II), $(M^vO_zY_nR^1_p)_w$ (Formula II);

where M is one or more of silicon, titanium and aluminum, v is the valence number of M and is 3 or 4, z is from 0.5 to 1.6 each Y is independently selected from —OH, —$OR^2$, halo,

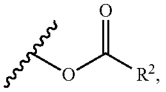

—$NH_2$, —$NHR^2$, —$N(R^2)_2$, and

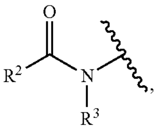

wherein $R^2$ is a $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, $R^3$ is a H, $C_1$ to $C_{20}$ alkyl, $C_1$ to $C_{20}$ alkylene, $C_6$ to $C_{22}$ aryl, or a 5-12 membered heteroaryl comprising from 1 to 3 ring heteroatoms selected from O, N, and S, n is from 0 to (v-1), each $R^1$ is independently selected from a $C_1$ to $C_{30}$ alkyl, a $C_1$ to $C_{30}$ alkylene, a $C_1$ to $C_{30}$ alkyl substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, and a $C_1$ to $C_{30}$ alkylene substituted with one or more of a halogen, —$OCF_3$, —$NO_2$, —CN, —NC, —OH, —OCN, —NCO, alkoxy, epoxy, amino, mercapto, acryloyl, $CO_2H$, $CO_2$alkyl, aryl, and heteroaryl, p is present in an amount up to pmax, and w is from 2 to 2000;

wherein pmax=60/[9*Mw($R^1$)+8], where Mw($R^1$) is the molecular weight of the $R^1$ group.

19. The low-water composition of claim 18, wherein the compound of formula (II) has a Polystyrene equivalent Weight Average Molecular Weight (Mw) of from about 700 Da to about 30,000 Da.

* * * * *